United States Patent
Gao et al.

(10) Patent No.: US 12,482,012 B2
(45) Date of Patent: Nov. 25, 2025

(54) ROBUST DISPATCH METHOD FOR FLEXIBILITY RESOURCES OF LARGE-SCALE DATA CENTER MICROGRID CLUSTER

(71) Applicant: Shenzhen Polytechnic University, Shenzhen (CN)

(72) Inventors: Xiang Gao, Shenzhen (CN); Yuxuan Wang, Shenzhen (CN); Yuduo Zhao, Shenzhen (CN); Siyuan Guo, Shenzhen (CN); Yuexin Sun, Shenzhen (CN); Zhihao Hua, Shenzhen (CN)

(73) Assignee: Shenzhen Polytechnic University, Shenzhen (CN)

( * ) Notice: Subject to any disclaimer, the term of this patent is extended or adjusted under 35 U.S.C. 154(b) by 127 days.

(21) Appl. No.: 18/518,700

(22) Filed: Nov. 24, 2023

(65) Prior Publication Data

US 2024/0095764 A1    Mar. 21, 2024

(30) Foreign Application Priority Data

May 19, 2023   (CN) .......................... 202310570778.5

(51) Int. Cl.
  *G06Q 30/02*   (2023.01)
  *G06Q 10/0631* (2023.01)
  *G06Q 30/0202* (2023.01)
  *G06Q 50/06*   (2012.01)
  *H02J 13/00*   (2006.01)

(52) U.S. Cl.
  CPC ... *G06Q 30/0202* (2013.01); *G06Q 10/06311* (2013.01); *G06Q 50/06* (2013.01); *H02J 13/00002* (2020.01)

(58) Field of Classification Search
  None
  See application file for complete search history.

(56) References Cited

U.S. PATENT DOCUMENTS

| | | | |
|---|---|---|---|
| 9,342,375 B2 * | 5/2016 | Hyser | G06F 9/5094 |
| 2011/0029147 A1 * | 2/2011 | Sun | G05B 15/02 |
| | | | 700/295 |
| 2016/0013652 A1 * | 1/2016 | Li | H02J 3/004 |
| | | | 307/24 |

FOREIGN PATENT DOCUMENTS

| | | |
|---|---|---|
| CN | 115114769 A | 9/2022 |
| CN | 115713151 A | 2/2023 |

\* cited by examiner

*Primary Examiner* — Alan Torrico-Lopez

(57) ABSTRACT

The robust dispatch method for flexibility resources of large-scale data center microgrid clusters characterizes overall scheduling capacity of multiple flexibility resources in each data center microgrid by establishing a virtual battery model, constructs an equivalent model of scheduling capacity of data center microgrid cluster based on constraint space superposition methods of Minkowski summation, and fully exploits flexibility of output power regulation of distributed generator sets and energy storage of the data center microgrid cluster as well as demand response characteristics of loads, so as to obtain regulation domain of aggregate power of the data center microgrid cluster.

10 Claims, 7 Drawing Sheets

ROBUST DISPATCH METHOD FOR FLEXIBILITY RESOURCES OF LARGE-SCALE DATA CENTER MICROGRID CLUSTER

CROSS-REFERENCE TO RELATED APPLICATIONS

This application claims the benefit of priority from Chinese Patent Application No. 202310570778.5, filed on May 19, 2023. The content of the aforementioned application, including any intervening amendments thereto, is incorporated herein by reference in its entirety.

TECHNICAL FIELD

This application relates to dispatching of data center microgrid clusters, and more particularly to a day-ahead-intraday two-stage robust dispatch model for flexibility resources of a large-scale data center microgrid cluster.

BACKGROUND

With the vigorous development of the grid advanced metering infrastructure (AMI) and power big data technology, the number of large-scale data centers used by hyperscale operators will continue to grow rapidly to support the increasingly expanding business operations, which will lead to a rapid rise in the proportion of data center power consumption in the power consumption of whole society. In 2020, there were more than 3 million data center racks in China, and the power consumption exceeded 200 billion kWh, which accounted for 2.7% of the total national electricity consumption. It is expected that the energy consumption of data centers will exceed 250 billion kWh in 2030, and the proportion of electricity consumption will rise to 3.7%. Therefore, how to enable the efficient and low-carbon operation of data centers has been an important issue to be solved.

Considering that the data centers have stringent requirements for power supply reliability, data center operators usually prepare corresponding backup power sources, such as gas turbines, diesel generators or energy storage devices, to ensure that the data centers can provide data services even when the power grid is down.

The data center microgrid, which is constituted by data center as the main body, distributed generator sets and energy storage equipment, has potential flexibility, and fully exploiting the output power regulation flexibility of the distributed generator sets and energy storage equipment in the data center microgrid cluster as well as the demand response characteristics of the load can provide backup and auxiliary power regulation services for the external power grid.

Therefore, characterizing the power flexibility regulation domain of data center microgrids and performing coordinated optimal scheduling on data center microgrid clusters are of great significance for improving the regulation of grid operation. However, the existing technologies are all aimed at optimal scheduling of individual data center microgrids, and there is no method capable of realizing the flexibility characterization of data center microgrid clusters and coordinated scheduling of multiple flexibility resources.

SUMMARY

The object of the present application is to provide a robust dispatch method for flexibility resources of a large-scale data center microgrid cluster to solve the problem in the prior art that there is no method capable of realizing the flexibility characterization of data center microgrid clusters and coordinated scheduling of multiple flexibility resources.

Technical solutions of this application are described as follows.

In a first aspect, this application provides a robust dispatch method for flexibility resources for a large-scale data center microgrid cluster, including:

establishing a virtual battery model representing flexibility regulation capacity of each of a plurality of data center microgrids based on adjustable flexibility resources in each of the plurality of data center microgrids;

obtaining a flexibility region of each of the plurality of data center microgrids based on flexibility supply capacity and flexibility demand capacity of the data center microgrid, and aggregating the flexibility regions of the plurality of the data center microgrids based on Minkowski summation of constrained spaces, to obtain a power flexibility adjustable interval;

based on day-ahead forecast information of renewable energy source, workload, and market electricity price, obtaining an optimal resource-load scheduling plan for each of the plurality of data center microgrids at time T of a following day with an objective of minimizing a total operating cost of a data center operator and with power balance, gas turbine, energy storage, and schedulable load as constraints;

based on an error in forecasting of an output of the renewable energy source and the workload, considering an intraday scheduling model under a flexibility aggregated power with an objective of minimizing an intraday balancing market penalty and system rescheduling cost, and coordinating the gas turbine, the schedulable load, and the energy storage by rolling optimization to adjust the optimal resource-load scheduling plan in real time; and based on the optimal resource-load scheduling plan and the intraday scheduling model, establishing a day-ahead-intraday two-stage robust dispatch model for flexibility resources of the data center microgrid cluster.

In an embodiment, the step of "based on the optimal resource-load scheduling plan and the intraday scheduling model, establishing a day-ahead-intraday two-stage robust dispatch model for flexibility resource of the large-scale data center microgrid cluster" comprises:

in a first stage, coordinating information interaction among each data center microgrid, to minimize the total operating cost of the data center operator; and in a second stage, based on the first stage, considering uncertainty of photovoltaic output and a prediction error for the workload; and coordinating the gas turbine, the schedulable load, and the energy storage by rolling optimization to adjust the optimal resource-load scheduling plan in real time.

In an embodiment, the data center microgrid is configured by an aggregation of the renewable energy source, the energy storage, the gas turbine, and a controllable load in a microgrid;

the step of "establishing a virtual battery model representing flexibility regulation capacity of a data center microgrid based on adjustable flexibility resource in the data center microgrid" comprises:

assuming that time is discrete, an adjustable flexibility power of a multi-cluster system satisfies:

$$E_{i,t+1}^{W} = \begin{cases} E_{MC,i,t}^{load} + \sigma_+ P_{i,t}^{VB} \Delta t & P_{i,t}^{VB} \geq 0 \\ E_{MC,i,t}^{load} + \dfrac{1}{\sigma_-} P_{i,t}^{VB} \Delta t & P_{i,t}^{VB} < 0 \end{cases} ; \quad (1)$$

$$\underline{P}_{i,t}^{VB} \leq P_{i,t}^{VB} \leq \overline{P}_{i,t}^{VB}; \text{ and} \quad (2)$$

$$\underline{E}_{i,t+1}^{W} \leq E_{i,t+1}^{W} \leq \overline{E}_{i,t+1}^{W}; \quad (3)$$

wherein $E_{i,t+1}^{W}$ is flexibility resource reserve energy of a cluster i at time t+1; $E_{MC,i,t}^{load}$ is a load bearing state of the cluster i at time t; $\sigma_+$ is charging efficiency; $\sigma_-$ is discharging efficiency; $P_{i,t}^{VB}$ is an adjustable flexibility power of the virtual battery model of the cluster i at the time t in time $\Delta t$; $\overline{P}_{i,t}^{VB}$ is an upper limit of $P_{i,t}^{VB}$, $\underline{P}_{i,t}^{VB}$ is a lower limit of $P_{i,t}^{VB}$; $\underline{E}_{i,t+1}^{W}$ is a downward adjustment constraint of a flexibility energy of the cluster i at the time t+1; $\overline{E}_{i,t+1}^{W}$ is an upward adjustment constraint of the flexibility energy of the cluster i at the time t+1; Defining $E_{MC,i,t}^{load} = \dot{C}_{i,t} E_{MC,i}^{W}$, $E_{i,t+1}^{W}$ satisfies:

$$E_{i,t+1}^{W} = \begin{cases} \dot{C}_{i,t} E_{MC,i}^{W} + \sigma_+ P_{i,t}^{VB} \Delta t & P_{i,t}^{VB} \geq 0 \\ \dot{C}_{i,t} E_{MC,i}^{W} + \dfrac{1}{\sigma_-} P_{i,t}^{VB} \Delta t & P_{i,t}^{VB} < 0 \end{cases} ; \quad (4)$$

wherein $\dot{C}_{i,t}$ is an energy state variable of the cluster i at the time t, satisfying a range of $0 \leq \dot{C}_{i,t} \leq 1$; $\dot{C}_{i,t}$ depends on a current load borne by the cluster i at the time t; and $E_{MC,i}^{VB}$ is a total capacity of all adjustable flexibility power of the cluster i.

In an embodiment, the data center microgrid comprises a data center, the renewable energy source, the gas turbine, and an energy storage system;

the data center microgrid is connected to an upper-level power grid through a transformer; flexibility of the data center microgrid is determined by the flexibility supply capacity and the flexibility demand capacity in the data center microgrid; flexibility supply is provided by the energy storage system and the gas turbine in the data center microgrid; flexibility demand is determined by scheduling of task loads by the data center; and according to different network demands of users, data center workloads are divided into a delay-sensitive workload and a delay-tolerant workload;

the step of "obtaining a flexibility region of each of the plurality of data center microgrids based on flexibility supply capacity and flexibility demand capacity of the data center microgrid; and aggregating the flexibility regions of the plurality of data center microgrids based on Minkowski summation of constrained spaces, to obtain a power flexibility adjustable interval" comprises:

obtaining a formula of calculating total load power of the data center, expressed as:

$$P_{i,t}^{load} = P_{i,t}^1 + P_{i,t}^2 + P_{i,t}^3 + P_{i,t}^4 \quad (5); \text{ and}$$

$$P_{i,t}^{loada} = P_{i,t}^2 \quad (6);$$

wherein $P_{i,t}^{load}$ is a load power of a data center i at the time t; $P_{i,t}^1$ is basic energy consumption of a data center server; $P_{i,t}^2$ is energy consumption of processing the delay-tolerant workload; $P_{i,t}^3$ is energy consumption of processing the delay-sensitive workload; and $P_{i,t}^4$ is energy consumption of the cooling system; since schedulable load of the data center microgrid is the delay-sensitive workload, schedulable load $P_{i,t}^{loada}$ of the data center i satisfies $P_{i,t}^{loada} = P_{i,t}^2$, and formulas for calculating $P_{i,t}^{loada}$ are expressed as:

$$\begin{cases} P_{i,t}^1 = P_{idle}^{\xi} m_{i,t}^{\xi} + P_{idle}^{\vartheta} m_{i,t}^{\vartheta} \\ P_{i,t}^2 = \dfrac{P_{peak}^{\vartheta} - P_{idle}^{\vartheta}}{\mu_i^{\vartheta}} \vartheta_{i,t} \\ P_{i,t}^3 = \dfrac{P_{peak}^{\xi} - P_{idle}^{\xi}}{\mu_i^{\xi}} \xi_{i,t} \\ P_{i,t}^4 = \kappa_1 Q_{i,t}^c + \kappa_2 \end{cases} ; \quad (7)$$

wherein $P_{idle}^{\xi}$ is a no-load power of a single server configured to process the delay-sensitive workload; $P_{peak}^{\xi}$ is a full-load power of the single server configured to process the delay-sensitive workload; $P_{idle}^{\vartheta}$ is a no-load power of a single server configured to process the delay-tolerant workload; $P_{peak}^{\vartheta}$ is a full-load power of the single server configured to process the delay-tolerant workload; $m_{i,t}^{\xi}$ is the number of active servers configured to process the delay-sensitive workload; $m_{i,t}^{\vartheta}$ is the number of active servers configured to process the delay-tolerant workload; $\xi_{i,t}$ is the amount of the delay-sensitive workload to be processed at the time t; $\vartheta_{i,t}$ is the amount of the delay-tolerant workload to be processed at the time t; $\mu_i^{\xi}$ represents average utilization rate of the single server for processing the delay-sensitive workload; $\mu_i^{\vartheta}$ represents average utilization rate of the single server for processing the delay-tolerant workload; $Q_{i,t}^c$ represents cooling capacity of the data center; and $\kappa_1$ and $\kappa_2$ performance coefficients of the cooling system.

In an embodiment, after obtaining the formula of calculating total load power of the data center, upper and lower limits of energy of a unit storage energy system backward from the time t are derived as follows:

$$E_{ESS,t}^{max\ 1} = \max((E_{ESS}^o + P_{ESS}^{max} t \Delta t), E_{ESS}^{max}) \quad (8);$$

$$E_{ESS,t}^{max\ 2} = \min((E_{ESS}^o + P_{ESS}^{max}(T_{end}-t)\Delta t), E_{ESS}^{max}) \quad (9);$$

$$E_{ESS,t}^{max} = \min(E_{ESS,t}^{max\ 1}, E_{ESS,t}^{max\ 2}) \quad (10);$$

$$E_{ESS,t}^{min\ 1} = \max((E_{ESS}^o + P_{ESS}^{min} t \Delta t), E_{ESS}^{min}) \quad (11);$$

$$E_{ESS,t}^{min\ 2} = \min((E_{ESS}^o + P_{ESS}^{min}(T_{end}-t)\Delta t), E_{ESS}^{min}) \quad (12);$$

$$E_{ESS,t}^{min} = \max(E_{ESS,t}^{min\ 1}, E_{ESS,t}^{min\ 2}) \quad (13);$$

$$P_{ESS,t}^{max} = \min((E_{ESS,t+1}^{max} - E_{ESS,t}^{min})/\Delta t, P_{ESS}^{max}) \quad (14); \text{ and}$$

$$P_{ESS,t}^{min} = \max((E_{ESS,t+1}^{min} - E_{ESS,t}^{max})/\Delta t, P_{ESS}^{min}) \quad (15);$$

wherein $E_{ESS}^0$ is an initial capacity of the energy storage system (ESS); $E_{ESS,t}^{max\ 1}$ is an upper limit of energy backward from a starting time; $E_{ESS,t}^{max\ 2}$ is an upper limit of energy forward from an end time; $E_{ESS,t}^{min\ 1}$ is a lower limit of energy backward from the starting time; $E_{ESS,t}^{min\ 2}$ is a lower limit of energy forward from the end time; $E_{ESS}^{max}$ is a preset upper limit of energy; $E_{ESS}^{min}$ is a preset lower limit of energy; $E_{ESS,t}^{max}$ is an upper limit of energy of the ESS at the time t; $E_{ESS,t}^{min}$ is a lower limit of energy of the ESS at the time t; $P_{ESS}^{max}$ is a maximum power of the ESS; $P_{ESS}^{min}$ is a minimum power of the ESS; $T_{end}$ is a value of a last moment in a solution process; $P_{ESS,t}^{max}$ is a upper limit of an actual power of the ESS at the time t; and $P_{ESS,t}^{min}$ is a lower limit of the actual power of the ESS at the time t;

Minkowski summation is used to integrate a quantitative feasible set of battery storage for the renewable energy source and the gas turbine and a feasible set of the energy storage system and the schedulable load to obtain a flexibility feasible set $Z_{ac}$, expressed as:

$$Z_{ac}=Z_{ess} \oplus Z_{gt} \oplus Z_{loada} \oplus Z_{pv} \quad (16);$$

wherein $Z_{ess}$ is a flexibility feasible set for the energy storage systems of all the data center microgrid clusters; $Z_{gt}$ is a flexibility feasible set of the gas turbine; $Z_{loada}$ is a flexibility feasible set of the schedulable load; $Z_{pv}$ is a flexibility feasible set of photovoltaic (PV) resource; and $\oplus$ represents the Minkowski summation.

In an embodiment, after the Minkowski summation is used to integrate the quantitative feasible set of battery storage for the renewable energy source and the gas turbine and the feasible set of the energy storage system and the schedulable load to obtain the flexibility feasible set $Z_{ac}$, based on the Minkowski summation, an upper limit and a lower limit of energy, and an upper and a lower limit of power of an integration model of the data center microgrid cluster are expressed as:

$$\overline{E}_{i,t}^W = \sum_{j=1}^{Ne}(E_{ESS,t}^{max}) + \sum_{j=1}^{Ng}(E_{gt,t}^{max}) + \sum_{j=1}^{Nl}(E_{load,t}^{max}) - \left(\sum_{i=1}^{Np} P_{i,t-1}^{PV} \cdot \Delta t\right); \quad (17)$$

$$\underline{E}_{i,t}^W = \sum_{j=1}^{Ne}(E_{ESS,t}^{min}) + \sum_{j=1}^{Ng}(E_{gt,t}^{min}) + \sum_{j=1}^{Nl}(E_{load,t}^{min}) - \left(\sum_{i=1}^{Np} P_{i,t-1}^{PV} \cdot \Delta t\right); \quad (18)$$

$$\overline{P}_{i,t}^{DAS} = \sum_{j=1}^{Ne}(P_{ESS,t}^{max}) + \sum_{j=1}^{Ng}(P_{gt,t}^{max}) + \sum_{j=1}^{Nl}(P_{load,t}^{max}) - \sum_{i=1}^{Np} P_{i,t}^{PV}; \text{ and} \quad (19)$$

$$\underline{P}_{i,t}^{DAS} = \sum_{j=1}^{Ne}(P_{ESS,t}^{min}) + \sum_{j=1}^{Ng}(P_{gt,t}^{min}) + \sum_{j=1}^{Nl}(P_{load,t}^{min}) - \sum_{i=1}^{Np} P_{i,t}^{PV}; \quad (20)$$

wherein $\overline{E}_{i,t}^W$ is an upper limit of flexibility resource energy of the data center microgrid cluster i at the time t; $\underline{E}_{i,t}^W$ is a lower limit of the flexibility resource energy of the data center microgrid cluster i at the time t; $\overline{P}_{i,t}^{DAS}$ an upper limit of flexibility resource power of the data center microgrid cluster i at the time t; $\underline{P}_{i,t}^{DAS}$ is a lower limit of the flexibility resource power of the data center microgrid cluster i at the time t; a subscript j represents a corresponding flexibility resource j in the data center microgrid cluster i; $P_{i,t}^{PV}$ is a i-th PV power at the time t; Ne is the number of energy storage; Ng is the number of the gas turbine; Nl is the number of the scheduling load; and Np is the number of the renewable energy source.

In an embodiment, an objective function of the optimal resource-load scheduling plan for each data center at the time T of the following day is expressed as:

min $$\sum_{t=1}^{T}\sum_{i=1}^{N}\left(F_{i,t}^{gd-da} + F_{i,t}^{gt-da} + F_{i,t}^{ess-da} + F_{i,t}^{loada-da} - \overline{E}_{i,t}^{WS}\delta_t^{cap+} - \underline{E}_{i,t}^{WS}\delta_t^{cap-}\right); \quad (21)$$

wherein T represents a scheduling moment on the following day; N is the number of the data center microgrid clusters; $F_{i,t}^{gd-da}$ represents cost of electricity purchase of a power grid at the first stage; $F_{i,t}^{gt-da}$ represents operating cost of the gas turbine at the first stage; $F_{i,t}^{ess-da}$ represents operating cost of the energy storage system at the first stage; $F_{i,t}^{loada-da}$ represents scheduling cost of the delay-sensitive workload at the first stage; $\delta_t^{cap+}$ and $\delta_t^{cap-}$ represent respectively clearing prices obtained from bidding for reserve capacity in an ancillary service market; $\overline{E}_{i,t}^{WS}$ is an upper limit of the flexibility resource energy of the data center microgrid cluster i at the time t; $\underline{E}_{i,t}^{WS}$ is a lower limit of the flexibility resource energy of the data center microgrid cluster i at the time t;

formulas for calculating $F_{i,t}^{gd-da}$, $F_{i,t}^{gt-da}$, $F_{i,t}^{ess-da}$, and $F_{i,t}^{loada-da}$ are expressed as:

$$\begin{cases} F_{i,t}^{gd-da} = P_{i,t}^{gd}\delta_{i,t}^{gd-da}\Delta t \\ F_{i,t}^{gt-da} = (P_{i,t}^{gt}\delta_{i,t}^{gt1}/H_i^{gt}\eta_i^{gt} + P_{i,t}^{gt}\delta_{i,t}^{gt2})\Delta t \\ F_{i,t}^{ess-da} = (P_{i,t}^{essa} + P_{i,t}^{essb})\delta_i^{ess}\Delta t \\ F_{i,t}^{loada-da} = N_{i,t}^{tr}\delta_i^{tr} \end{cases} \quad (22)$$

wherein $\delta_{i,t}^{gd-da}$ represents a forecasted electricity price of a day-ahead market in which the data center microgrid cluster i is located at the time t; $\delta_{i,t}^{gt1}$ represents gas purchase cost per unit electricity generated by the gas turbine in the data center microgrid cluster i; $\delta_{i,t}^{gt2}$ represents operating cost per unit electricity generated by the gas turbine in the data center microgrid cluster i; $H_i^{gt}$ represents a calorific value of the gas turbine in the data center microgrid cluster i; $\eta_i^{gt}$ represents generating efficiency of the gas turbine in the data center microgrid cluster i; $\delta_i^{ess}$ represents unit operation cost of the energy storage system in the data center microgrid cluster i; $N_{i,t}^{tr}$ represents the number of spatial scheduling of the delay-sensitive workload in the data center microgrid cluster i; $\delta_i^{tr}$ represents unit scheduling cost of the delay-sensitive workload; $\Delta t$ represents scheduling periodic time; $P_{i,t}^{gd}$ represents supplying power of the power grid; $P_{i,t}^{essa}$ represents charging power of the energy storage system in the data center microgrid cluster i; $P_{i,t}^{essb}$ represents discharging power of the energy storage system in the data center microgrid cluster i; and $P_{i,t}^{gt}$ represents supplying power of the gas turbine in the data center microgrid cluster i.

In an embodiment, the step of "based on an error in forecasting of an output of the renewable energy source and the workload, considering an intraday scheduling model under a flexibility aggregated power with an objective of minimizing an intraday balancing market penalty and system rescheduling cost, and coordinating the gas turbine, the schedulable load, and the energy storage by rolling optimization to adjust the optimal resource-load scheduling plan in real time" further comprises:

obtaining a formula for representing aggregation scenario of resource flexibility of the data center microgrid cluster, expressed as:

$$P_{i,t}^{pro}=-\overline{P}_{i,t}^{VB\wedge}+\underline{P}_{i,t}^{VB\vee}+P_{i,t}^{gd}+P_{i,t}^{gt}+P_{i,t}^{essa}-P_{i,t}^{essb} \quad (23); \text{ and}$$

$$P_{i,t}^{da}=P_{i,t}^{gd}+P_{i,t}^{gt}+P_{i,t}^{essa}-P_{i,t}^{essb} \quad (24)$$

wherein $P_{i,t}^{pro}$ is a total power of the data center microgrid cluster i under management of an interactive platform at the time t; $\overline{P}_{i,t}^{VB\wedge}$ is an upper reserve capacity of the data center microgrid cluster i under the management of the interactive platform at the time t; $\underline{P}_{i,t}^{VB\vee}$ is a lower reserve capacity of the data center microgrid cluster i under the management of the interactive platform at the time t; and $P_{i,t}^{da}$ is a predicted power of the data center microgrid cluster i under the management of the interactive platform at the first stage at the time t;

obtaining a feasible set of flexibility resources defined and integrated in the data center microgrid:

$$x \in Z_{ac} = Z_{ess} \oplus Z_{gt} \oplus Z_{loada} \oplus Z_{pv} \quad (25);$$

obtaining upper and lower ranges of regulation capacity:

$$0 \le P_{i,t}^x \le \overline{P}_{i,t}^{VBmax}; \quad (26)$$

$$0 \le P_{i,t}^x \le \underline{P}_{i,t}^{VBmin}; \quad (27)$$

$$P_{i,t}^\vee \le \sum_{x \in Z_{ac}} (P_{i,t}^x - P_{i,t}^{x,min}); \text{ and} \quad (28)$$

$$P_{i,t}^\wedge \le \sum_{x \in Z_{ac}} (P_{i,t}^{x,max} - P_{i,t}^x); \quad (29)$$

wherein $P_{i,t}^\wedge$ is an upper reserve power of a preset power regulation; $P_{i,t}^\vee$ is a lower reserve power of the preset power regulation; $P_{i,t}^x$ is a scheduling power of resource integration; $P_{i,t}^{x,max}$ is a power upper limit of the resource integration; $P_{i,t}^{x,min}$ is a power lower limit of the resource integration; $\overline{P}_{i,t}^{VBmax}$ is an upper limit of power regulation; $\underline{P}_{i,t}^{VBmin}$ is a lower limit of the power regulation; and the formulas (28) and (29) represent power limitations determined by the resource flexibility.

In an embodiment, an objective function of the intraday scheduling model under the flexibility aggregate power is expressed as:

$$\min \sum_{t=t_0}^{t_0+T_{DN}} \sum_{i=1}^{N} (F_{i,t}^{dn} + F_{i,t}^{gt-dn} + F_{i,t}^{ess-dn} + F_{i,t}^{loada-dn}) - \quad (30)$$

$$F_{i,t}(P_{i,t}^{x+1,min}, P_{i,t}^{da}, P_{i,t}^{x+1,max});$$

wherein $t_0$ is a start time of an optimization window in the second stage; $T_{DN}$ represents rolling optimization window time in the second stage; $F_{i,t}^{dn}$ represents balancing market penalty of the data center microgrid cluster i in the second stage; $F_{i,t}^{gt-dn}$ represents operating cost of the gas turbine in the second stage; $F_{i,t}^{ess-dn}$ represents operating cost of the energy storage system in the second stage; $F_{i,t}^{loada-dn}$ represents scheduling cost of the delay-sensitive workload in the second stage; $F_{i,t}$ represents a revenue function obtained from provision of reserve capacity auxiliary service, expressed as formula (32) under discrete time; $P_{i,t}^{x+1,min}$ represents upside reserve capacity of the data center microgrid cluster i under flexibility aggregate power solution in the second stage; $P_{i,t}^{x+1,max}$ represents downside reserve capacity of the data center microgrid cluster i under the flexibility aggregate power solution in the second stage, which satisfies constraints of an flexible power interval $[P_{i,t}^{x,min}, P_{i,t}^{x,max}]$ for finding a solution of the virtual battery model based on the Minkowski summation in day-ahead scheduling; and $P_{i,t}^{da}$ is a predicted power in the first stage; $F_{i,t}^{gt-dn}$ is calculated by the following formulas:

$$\begin{cases} F_{i,t}^{dn} = \begin{cases} \alpha_i \delta_{i,t}^{balan} \Delta P_{i,t}^{dan} \Delta t, \Delta P_{i,t}^{dan} > 0 \\ \beta_i \delta_{i,t}^{balan} \Delta P_{i,t}^{dan} \Delta t, \Delta P_{i,t}^{dan} < 0 \end{cases} \\ F_{i,t}^{gt-dn} = (P_{i,t}^{gt} \delta_{i,t}^{gr1}/H_i^{gt} \eta_i^{gt} + P_{i,t}^{gt2} \delta_i^{gt2}) \Delta t; \text{ and} \\ F_{i,t}^{ess-dn} = (P_{i,t}^{essa} + P_{i,t}^{essb}) \delta_i^{ess} \Delta t \\ F_{i,t}^{loada-dn} = N_{i,t}^{tr} \delta_i^{tr} \end{cases} \quad (31)$$

$$F_{i,t} = \delta_{i,t}^{up}(P_{i,t}^{x+1,max}t - P_{i,t}^{da})^2 + \delta_{i,t}^{down}(P_{i,t}^{da} - P_{i,t}^{x+1,min})^2; \quad (32)$$

wherein $\delta_{i,t}^{balan}$ represents electricity price in the intraday balancing market; $\Delta P_{i,t}^{dan}$ represents deviation between intraday purchased power and a day-ahead plan; $\alpha_i$ is a parameter for controlling penalty price in the intraday balancing market when penalty is enforced on power consumption exceeding the day-ahead plan at a higher price than a real-time price; $\beta_i$ is a parameter for controlling the penalty price in the intraday balancing market when penalty is enforced on power consumption below the day-ahead plan at a lower price than the real-time price; $\delta_{i,t}^{up}$ is an upper reserve revenue coefficient; and $\delta_{i,t}^{down}$ is a lower reserve revenue coefficient.

In an embodiment, the step of "based on the optimal resource-load scheduling plan and the intraday scheduling model, establishing a day-ahead-intraday two-stage robust dispatch model for flexibility resource of the large-scale data center microgrid cluster" comprises:

obtaining an objective function of the day-ahead-intraday two-stage robust dispatch model:

$$\min F_{main} + \max_U \min F_{sub}; \quad (33)$$

wherein $F_{main}$ represents a first-stage optimization objective; min $F_{sub}$ represents a second-stage optimization objective; and U is an uncertainty set involving PV uncertainty and schedulable load uncertainty;

the uncertainty set U is expressed in formulas (34) to (37):

$$D_{v,t}^{dn} = D_{v,t}^0 + x_{v,t}^+(D_{v,t}^{max} - D_{v,t}^0) - x_{v,t}^-(D_{v,t}^0 - D_{v,t}^{min}) \forall v, t; \quad (34)$$

$$x_{v,t}^+ + x_{v,t}^- \le 1 \forall v, t; \quad (35)$$

$$\sum_{t=1}^{N_T}(x_{v,t}^+ + x_{v,t}^-) \le \prod_t \forall v; \text{ and} \quad (36)$$

$$\sum_{v=1}^{N_v}(x_{v,t}^+ + x_{v,t}^-) \le \prod_v \forall t; \quad (37)$$

wherein $N_v$ is the number of PV units; a superscript do represents an intraday optimization stage; $D_{v,t}^{max}$ represents a maximum value of available PV of a PV unit v at the time t; $D_{v,t}^{min}$ represents a minimum value of the available PV of the PV unit v at the time t; $x_{v,t}^+$ and $x_{v,t}^-$ are integer variables of 0-1, which denote whether or not the PV unit v is fluctuating at the time t; $\Pi_t$ and $\Pi_v$ are both uncertainty limits; the formula (34) represents an available PV $D_{v,t}^{dn}$ at the intraday optimization stage, which consists of a predicted value $D_{v,t}^0$ of the available PV superimposed on an upward fluctuation of PV; the formula (35) represents the available PV $D_{v,t}^{dn}$ in the intraday optimization stage, which consists of the predicted value $D_{v,t}^{0}$ of the available PV superimposed on a downward fluctuation of PV; the formula (36) represents a temporal uncertainty of PV; and the formula (37) represents a spatial uncertainty of PV;

introducing the amount of abandoned light to ensure feasibility of the intraday scheduling, expressed as:

$$\max_{x_{v,t}^+, x_{v,t}^- \in U} \min \sum_{t=t_0}^{t_0+T_{DN}} \sum_{i=1}^{N} (F_{i,t}^{dn} + F_{i,t}^{gt-dn} + F_{i,t}^{ess-dn} + F_{i,t}^{loada-dn}) - \quad (38)$$

$$F_{i,t}(P_{i,t}^{x+1,\min}, P_{i,t}^{da}, P_{i,t}^{x+1,\max}) + F^{cur} \sum_{v=1}^{N_v} (D_{v,t}^{dn} - P_{v,t}^{dn});$$

where $P_{v,t}^{dn}$ is PV consumption of the PV unit in the second stage; and $F^{cur}$ is penalty cost of the abandoned light.

This application has the following beneficial effects.

The robust dispatch method for flexibility resources of large-scale data center microgrid clusters provided by the present application can solve the current problem that there is no method for portraying the flexibility of data center microgrid clusters and coordinated scheduling of multiple flexibility resources. The robust dispatch method characterizes the overall scheduling capacity of multiple flexibility resources in each data center microgrid by establishing a virtual battery model, constructs an equivalent model of the scheduling capacity of the data center microgrid cluster based on the Minkowski summation of constrained spaces, and fully exploits the flexibility of the output power regulation of the distributed generator sets and energy storage of the data center microgrid cluster as well as the demand response characteristics of the loads, so as to obtain the regulation domain of the aggregate power of the data center microgrid cluster. Compared with the existing methods, the method herein can obtain the power flexibility regulation domain of the data center microgrid, to provide the flexibility power space constraints for the intraday scheduling.

BRIEF DESCRIPTION OF THE DRAWINGS

In order to illustrate the embodiments of the present disclosure or the technical solution in the prior art more clearly, the drawings required in the description of the embodiments or the prior art will be briefly described below. Obviously, presented in the drawings are merely some embodiments of the present disclosure, which are not intended to limit the disclosure. For those skilled in the art, other drawings may also be obtained according to the drawings provided herein without paying creative efforts.

DETAILED DESCRIPTION OF EMBODIMENTS

Figure 1:
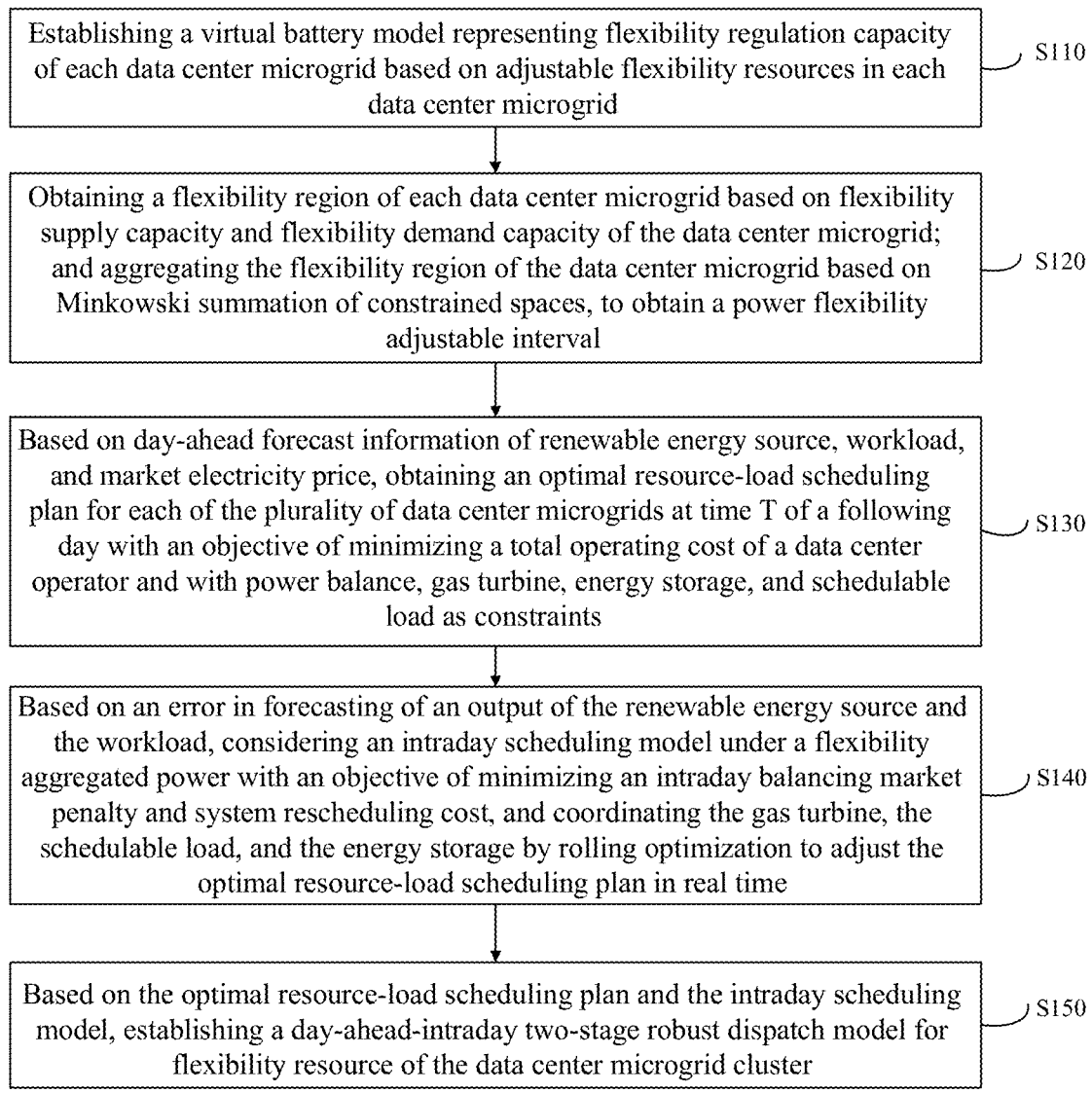
FIG. 1 is a flowchart of a robust dispatch method for flexibility resources of a large-scale data center microgrid cluster according to Embodiment 1 of the present disclosure.

The embodiments described herein are only intended to explain the disclosure and are not intended to limit the disclosure.

1. Data Center

A data center is used to install computer systems and related components. The data center includes multiple large-scale, high-performance computer servers used to deliver, accelerate, display, compute, and store data information, such as a supercomputing center. The data center will consume a large amount of electricity to provide computing services to users. The electrical loads used by the data center for computing services can be divided into "non-time-shiftable loads" (namely, "delay-sensitive workloads") and "time-shiftable loads" (namely, "delay-tolerant workloads").

(1) "Non-time-shiftable load" is the power consumed by computing service requests that need to be processed online in real time, such as online transactions, online payments, and web browsing demands. The "non-time-shiftable load" are not temporally flexible but spatially flexible in terms of scheduling. If the power consumption load of the microgrid a is large in time t, resulting in system overload, some of the computing service requests that require real-time online processing can be transferred to the data centers of other microgrids for processing, so that the non-time-shiftable loads of the microgrid a can be transferred to other microgrids, thereby realizing the spatial transfer of the non-time-shiftable loads among the microgrids.

(2) "Time-shiftable load" is the power consumed by computing service requests that can be delayed, such as image processing, computation processing, and data processing. The "time-shiftable load" has temporal flexibility and spatial flexibility in scheduling. If the microgrid a has a large power consumption load in time t that causes the system to be overloaded, some of the computing service requests that can be delayed are shifted from the time t to other permitted time periods for execution or to data centers in other microgrids for processing, so as to realize the temporal and spatial shifting of the time-shiftable loads.

The non-time-shiftable loads and time-shiftable loads of the data centers can provide a large amount of flexibility resources for microgrids. In addition, the data centers contain unregulated electrical loads, namely cooling loads (such as air conditioners, fans, and water cooling to cool computers), uninterruptible power supplies (UPS), and building loads (such as elevators and lighting), which cannot be used as flexibility resources.

2. Data Center Microgrid

A data center microgrid is a small power system established within the data center with independent energy supply and management capabilities. The data center microgrid is connected to the upper-level power grid (namely, power distribution network) through the substation. The upper-level power grid can transmit power to the microgrid through the substation. The data center microgrid also contains renewable energy resources (such as photovoltaic), storage systems (such as battery storage system), gas turbines (a type of distributed generator). The equipment ensures that the data center can operate autonomously and provide backup power in case of power outage or failure of the upper-level power grid to ensure continuous power supply to the data center.

3. Data Center Microgrid Cluster

Figure 5:
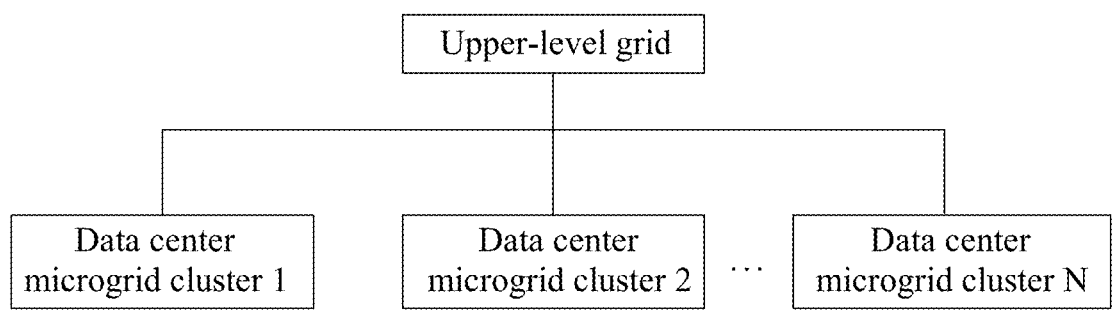
FIG. 5 schematically shows connection between multiple microgrid clusters and a power distribution network.
Figure 6:
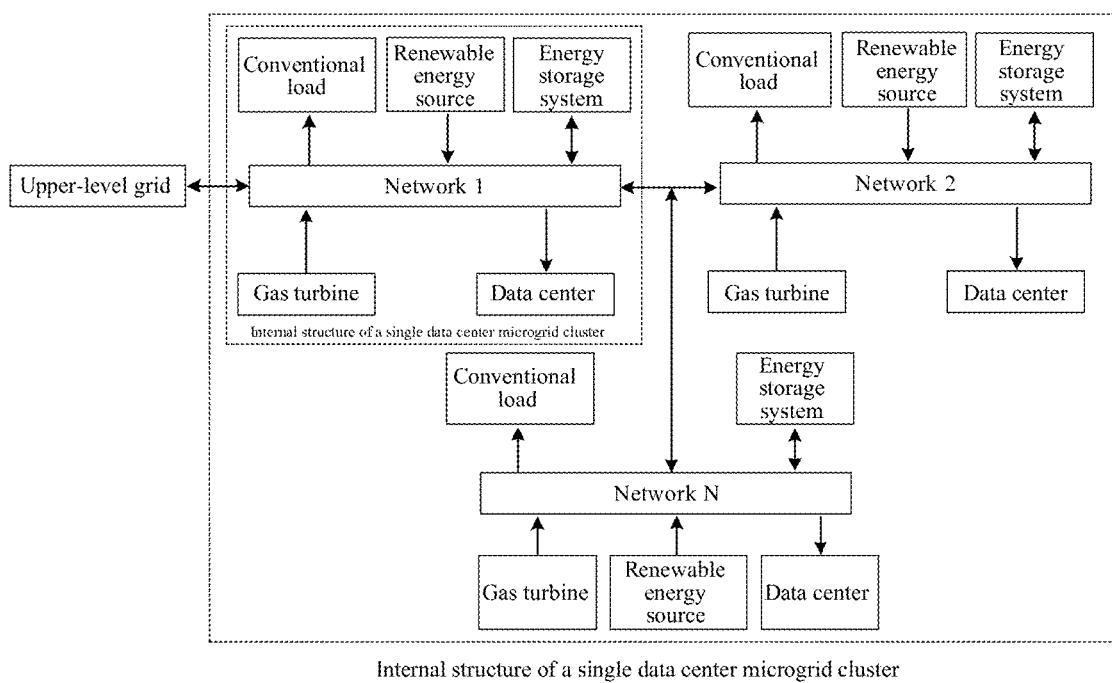
FIG. 6 schematically shows an internal structure of a microgrid cluster.

Data center microgrid cluster refers to consider multiple data center microgrids as a whole, which is controlled and managed by a microgrid cluster controller. FIG. 5 shows a connection relationship between the multiple microgrid clusters and the upper-level power grid. FIG. 6 shows the internal structure of the microgrid cluster. The microgrid cluster controller is responsible for managing and controlling all kinds of equipment in each microgrid cluster, and collecting the operating status information of the equipment, such as collecting the operating data and equipment information of gas turbines, the charging and discharging power of the energy storage system, the current capacity data of the energy storage system, the equipment information of the energy storage system, the power prediction data of the renewable energy sources, and the workload data of the data center. At the same time, the microgrid cluster controller can issue operation control commands to various types of equipment to set the operating power of the gas turbine to a specified value, the charging and discharging power of the energy storage system to a specified value, and the amount of renewable energy to be utilized.

4. Flexibility Resources

Flexibility resources are defined in existing literature as resources that can adjust flexibly and maintain a dynamic balance between supply and demand in a system. In this disclosure, the flexibility resources can be simply understood as equipment or facilities that can change the power operation state according to the instructions of the microgrid cluster controller, i.e., renewable energy resources, gas turbines, energy storage systems, and data centers included in this disclosure.

5. Flexibility Region

Flexibility region means the interval $[P_{min}, P_{max}]$ consisting of the upper limit $P_{max}$ and the lower limit $P_{min}$ of the active power regulation of the equipment. The $P_{min}$ and $P_{max}$ can be obtained by calculating the virtual battery model. This disclosure first obtains the flexibility region of each equipment within a single microgrid, then obtains the flexibility region of each data center microgrid cluster through the Minkowski summation. The "power flexibility adjustment interval" is the flexibility region.

6. Day-Ahead-Intraday Two-Stage Robust Dispatch Model

The two-stage robust optimization model can be expressed as:

$$\min_{y} cy + \max_{u \in U} \min_{x \in F(y,u)} bx \text{ s.t. } Ay \geq d, y \in S_y,$$

$$F(y,u) = \{x \in S_x : Gx \geq h - Ey - Mu\}; \text{ and.}$$

$$\min_{y} cy + \max_{u \in U} \min_{x \in F(y,u)} bx \text{ s.t. } Ay \geq d, y \in S_y,$$

$$F(y,u) = \{x \in S_x : Gx \geq h - Ey - Mu\}$$

In above formulas, y is a decision variable of the first stage; x is a decision variable of the second stage; and u is an uncertainty variable of the second stage, whose value space is U. The first stage corresponds to the day-ahead stage of the disclosure, and the second stage corresponds to the intraday stage of the disclosure. The optimal decision in the first stage obtained by the two-stage robust optimization model can cope with the worst-case scenario in the second stage.

In this disclosure, the uncertainty quantities in the intraday stage are the generating capacity of the renewable energy resources and the electrical load capacity of the data center. The day-ahead stage is responsible for developing the planned values of the gas turbines, the energy storage systems, the generating capacity of the renewable energy resources, and the calculated electrical loads of the data center in each microgrid cluster i at time t. In the intraday stage, the generating capacity of the renewable energy resources and the calculated electrical loads of the data center may deviate from the planned values. Therefore, in the intraday stage, it is necessary to readjust the generating capacity of the gas turbines, the charge/discharge capacity of the storage systems, and the generating capacity of renewable energy resources based on the real-time generating capacity from renewable energy sources and the real-time calculated electrical load at the data center, and to transfer the non-time-shiftable and time-shiftable loads at the data center between the scheduling periods and between the microgrids.

Figure 7:
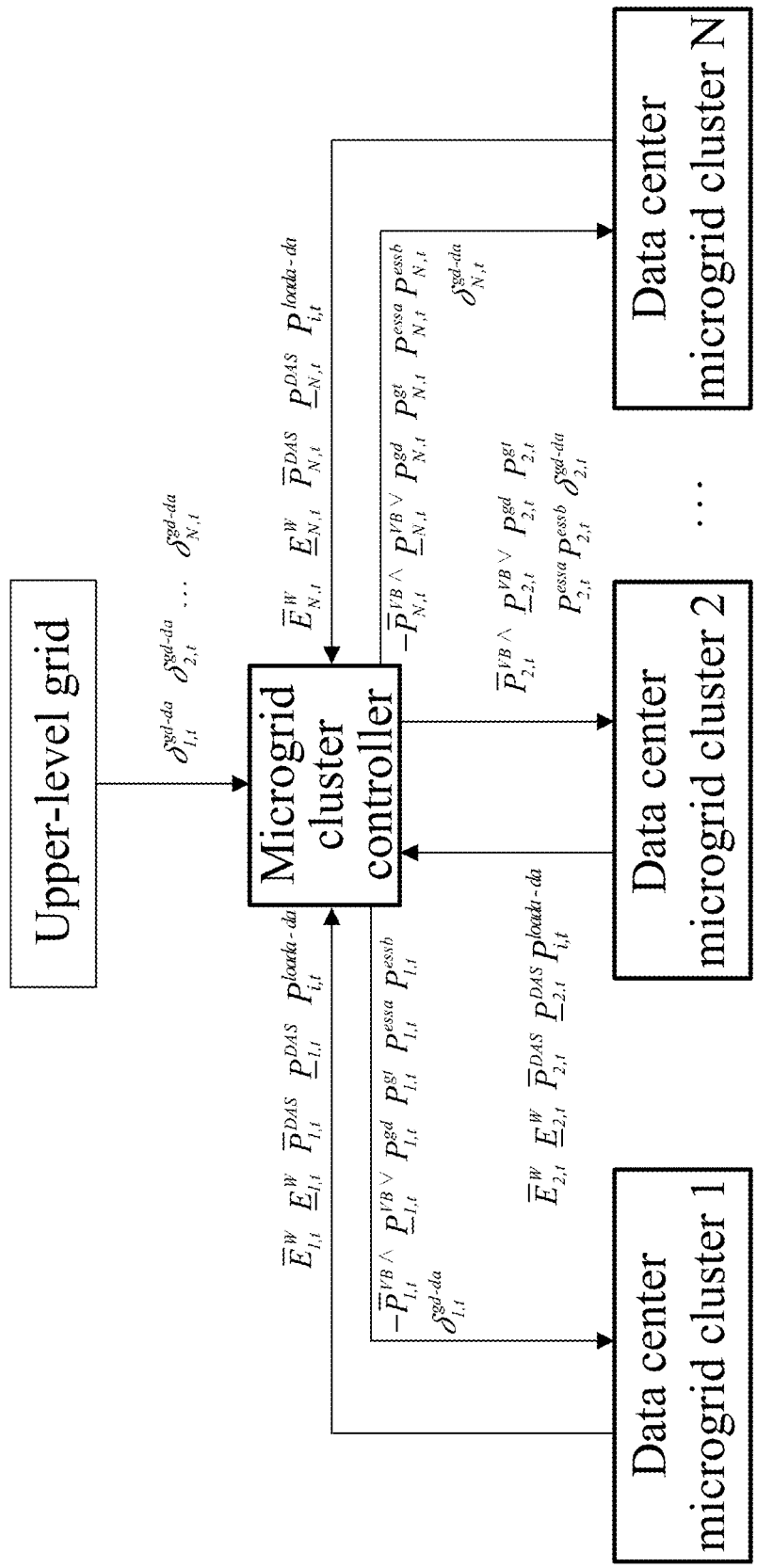
FIG. 7 schematically illustrates the data transmission among the power distribution network, a microgrid cluster controller and the microgrid clusters.

7. FIG. 7 shows the data transfer process between the main grid, the microgrid cluster controller and the microgrid clusters. The actions are described as follows.

1) The main grid passes the price data $\delta_{i,t}^{gd-da}$, i=1, 2, ..., N to the data center microgrid cluster controller.

2) The data center microgrid cluster controller receives the price data from the main grid and receives the data ($\overline{E}_{i,t}^{W}$, $\underline{E}_{i,t}^{W}$, $\overline{P}_{i,t}^{DAS}$, $\underline{P}_{i,t}^{DAS}$) related to the flexibility adjustment interval of each data center microgrid cluster i. The day-ahead-intraday two-stage robust dispatch model of the large-scale data center microgrid cluster flexibility resources proposed in this disclosure calculates the grid power command $P_{i,t}^{gd}$, the charging/discharging power command $P_{i,t}^{essa}/P_{i,t}^{essb}$ of the energy storage system, the power supply command $P_{i,t}^{gt}$, the upper reserve capacity command $\overline{P}_{i,t}^{VB}$, and the lower reserve capacity command $\underline{P}_{i,t}^{VB}$ of the gas turbine, and the electrical load regulation command $P_{i,t}^{loada-da}$ of the data center of the data center microgrid cluster i at the moment of time t.

(3) After receiving the above commands, the microgrid cluster controller issues operation commands to the various types of equipment controlled by the microgrid cluster controller: setting the day-ahead operation power of the gas turbine at time t as $P_{i,t}^{gt}$, the day-ahead charging/discharging power of the energy storage system as $P_{i,t}^{essa}/P_{i,t}^{essb}$, the day-ahead grid power supplying power as $P_{i,t}^{gd}$, the upper/lower reserve capacity as $\overline{P}_{i,t}^{VB}/\underline{P}_{i,t}^{VB}$, and the data center electrical load as $P_{i,t}^{loada-da}$.

(4) When the electrical load of the data center microgrid cluster i at time t in the intraday stage is higher than the day-ahead set value $P_{i,t}^{loada-da}$, some of the calculated loads corresponding to the non-time-shiftable load in the data center microgrid cluster i are transferred to the idle high-performance computer servers in other data center microgrid clusters for processing. Moreover, some of the calculated loads corresponding to the time-shiftable load are transferred to other time stages for processing or to the idle high-performance computer servers in other data center microgrid clusters for processing until the electrical load of the data center microgrid cluster i at time t is equal to the day-ahead set value $P_{i,t}^{loada-da}$.

The present disclosure relates to a dispatch method of a data center microgrid cluster. The data center computing power loads with spatial and temporal shiftable characteristics can provide a large amount of flexibility resources for the microgrid. However, in the prior art, only gas turbines, energy storage devices, and renewable energy sources in the microgrid are usually regarded as the flexibility resources, and the data center computing power loads are usually regarded as the flexibility resources. In addition, the existing methods do not aggregate the flexibility resources of the data center computing power loads, the gas turbines, the energy storage devices, and the renewable energy sources, which results in less flexibility in the data center microgrid clusters and makes it difficult to achieve more economical and flexible microgrid cluster dispatch.

Considering these problems in the prior art, the present disclosure first calculates the flexibility adjustable intervals for various devices and computing power loads within the data center microgrid. Then, the present disclosure aggregates various flexibility resources within the data center microgrid cluster as a whole by Minkowski summation and obtains the flexibility region for the data center microgrid cluster. Based on the information about the flexibility adjustable intervals for each data center microgrid cluster, the day-ahead-intraday two-stage robust dispatch model for flexibility resources of large-scale data center microgrid clusters is executed. The day-ahead scheduling plan for the data center microgrid cluster is calculated, and the operating power of the various devices is set to the planned value.

Compared with the prior art, the present disclosure has the following advantages.

(1) The present disclosure studies a data center microgrid cluster, considers the data center computing power load as flexibility resources, and can calculate the flexibility region for each scheduling period of the data center microgrid cluster.

(2) The present disclosure can collect data related to the flexibility region of each data center microgrid cluster and calculate the day-ahead scheduling plan that considers the flexibility of the data center microgrid cluster.

The present disclosure provides a robust dispatch method for flexibility resources of large-scale data center microgrid clusters.

Embodiment 1

As shown in FIG. 1, the robust dispatch method for flexibility resources of data center microgrid clusters includes the following steps.

(S110) Based on the adjustable flexibility resources in each of a plurality of the data center microgrids, a virtual battery model representing the flexibility regulation capability of each of the plurality of the data center microgrids is established to assess the flexibility regulation capability of the data center microgrid clusters.

In this embodiment, the virtual battery model herein includes an energy storage virtual battery model, a renewable energy virtual battery model, a gas turbine virtual battery model, and a schedulable load virtual battery model.

(S120) A flexibility region of each of the plurality of the data center microgrids is obtained based on the flexibility supply capacity and the flexibility demand capacity of the data center microgrids. The flexibility regions of the plurality of the data center microgrids are aggregated based on the Minkowski summation of constrained spaces to obtain a power flexibility adjustable interval.

(S130) Based on the day-ahead forecast information of the renewable energy sources, workloads, and market electricity price; with the objective of minimizing the total operating cost of the data center operator, and with the power balance, the gas turbine, the energy storage, and the schedulable workload as the constraints, the optimal resource-load scheduling plan for each of the plurality of data center microgrids at time T of a following day is optimally solved. The optimal resource-load scheduling plan is used for bidding for the electricity purchase to the day-ahead electricity market.

In this embodiment, Tis the total number of scheduling moments on the following day, and the moment t refers to one of the total scheduling moment T hereinafter.

(S140) Based on the error in forecasting of the renewable energy source and workloads, and with the objective of minimizing the intraday balancing market penalty and the system rescheduling cost, an intraday scheduling model under the flexibility aggregate power is considered. The gas turbine, the schedulable load, and the energy storage are coordinated by rolling optimization to adjust the optimal resource-load scheduling plan in real time, to help the dispatchers make full use of various flexibility resources in the intraday stage to correct day-ahead scheduling errors caused by various uncertainties, and track day-ahead plans to reduce intraday market penalties.

(S150) Based on the optimal resource-load scheduling plan and the intraday scheduling model, a day-ahead-intraday two-stage robust dispatch model for flexibility resources of the data center microgrid clusters is built. The day-ahead-intraday two-stage robust dispatch model clusters multiple data center microgrids into data center microgrid clusters for collaborative control and management and builds a two-stage robust optimization dispatch model with a min-max-min structure to get the optimal scheduling plan under the worst scenario.

The robust dispatch method for flexibility resources of data center microgrid clusters provided by the present application can solve the problem in the prior art that there is no method capable of realizing the flexibility characterization of data center microgrid clusters and coordinated scheduling of multiple flexibility resources. The robust dispatch method characterizes the overall scheduling capacity of multiple flexibility resources in each data center microgrid by establishing a virtual battery model, constructs an equivalent model of the scheduling capacity of the data center microgrid cluster based on Minkowski summation of constrained spaces, and fully exploits the flexibility of the output power regulation of the distributed generator sets and energy storage of the data center microgrid cluster as well as the demand response characteristics of the loads, so as to obtain the regulation domain of the aggregate power of the data center microgrid cluster. Compared with the existing methods, the method herein can obtain the power flexibility regulation domain of the data center microgrid, to provide the flexibility power space constraints for the intraday scheduling.

Embodiment 2

Based on the embodiment 1, step (S150) includes the following steps.

(S210) In the first stage (day-ahead stage), information interaction among each data center microgrid is coordinated to minimize the total operating cost of the data center operator.

(S220) In the second stage (intraday stage), based on the day-ahead stage, considering the uncertainty of the PV output and the prediction error for workloads, the gas turbine, the schedulable load, and the energy storage are coordinated in the rolling optimization manner to adjust the scheduling plan in real time, thereby tracking the day-ahead plan as much as possible in order to minimize the penalty of the intraday market and to provide the reserve capacity.

In addition, the prior art does not consider the uncertainty that exists in the PV output and workloads of the data center microgrid clusters in the intraday stage. The single day-ahead scheduling plan or intraday real-time scheduling method cannot satisfy the economic requirements of the scheduling of the data center operators. Moreover, there is a risk of weakening or even complete failure of the optimization schemes and strategies obtained by optimizing the scheduling based on deterministic models.

The present disclosure establishes the robust dispatch method for flexibility resources of the data center microgrid clusters, which clusters multiple data center microgrids into the data center microgrid cluster for collaborative control and management and establishes the optimal two-stage robust dispatch model with the min-max-min structure, to obtain the optimal scheduling scheme under the worst scenario.

In the first stage, information interaction among each data center microgrid is coordinated to minimize the total operating cost of the data center operator. In the second stage, based on the day-ahead stage, considering the uncertainty of the PV output and the prediction error for workloads, the workloads of each data center and the microgrids are coordinated in the rolling optimization manner to adjust the scheduling plan in real time, thereby tracking the day-ahead plan as much as possible in order to minimize the penalty of the intraday market and to provide the reserve capacity.

Compared with the existing methods, the present disclosure considers the uncertainty of PV output and workloads and can obtain the optimal scheduling plan under the worst scenario. Moreover, compared with deterministic optimization method, the advantage of the two-stage robust optimization method becomes more significant as the prediction error increases, and the obtained scheduling plan has stronger robustness and ability to withstand the fluctuation risk of PV output.

Embodiment 3

Based on embodiment 2, the data center microgrid consists of an aggregation of the renewable energy source, the energy storage, the gas turbine, and controllable loads in the microgrid. The step (S110) includes the following steps.

(S310) Let time be discrete, the adjustable flexibility power of the multi-cluster system satisfies the following formulas:

$$E_{i,t+1}^{W} = \begin{cases} E_{MC,i,t}^{load} + \sigma_+ P_{i,t}^{VB} \Delta t & P_{i,t}^{VB} \geq 0 \\ E_{MC,i,t}^{load} + \frac{1}{\sigma_-} P_{i,t}^{VB} \Delta t & P_{i,t}^{VB} < 0 \end{cases} ; \quad (1)$$

$$\underline{P}_{i,t}^{VB} \leq P_{i,t}^{VB} \leq \overline{P}_{i,t}^{VB}; \text{ and} \quad (2)$$

$$\underline{E}_{i,t+1}^{W} \leq E_{i,t+1}^{W} \leq \overline{E}_{i,t+1}^{W}. \quad (3)$$

In the above formulas, $E_{i,t+1}^{W}$ is flexibility resource reserve energy of a cluster i at time t+1; $E_{MC,i,t}^{load}$ is a load bearing state of the cluster i at time t; $\sigma_+$ is charging efficiency; $\sigma_-$ is discharging efficiency; $P_{i,t}^{VB}$ is an adjustable flexibility power of the virtual battery model of the cluster i at the time t in time $\Delta t$; $\overline{P}_{i,t}^{VB}$ is an upper limit of $P_{i,t}^{VB}$; $\underline{P}_{i,t}^{VB}$ is a lower limit of $P_{i,t}^{VB}$; $\underline{E}_{i,t+1}^{W}$ is a downward adjustment constraint of a flexibility energy of the cluster i at the time t+1; $\overline{E}_{i,t+1}^{W}$ is an upward adjustment constraint of the flexibility energy of the cluster i at the time t+1.

(S320) Defining $E_{MC,i,t}^{load} = \dot{C}_{i,t} E_{MC,i}^{W}$, $E_{i,t+1}^{W}$ satisfies:

$$E_{i,t+1}^{W} = \begin{cases} \dot{C}_{i,t} E_{MC,i}^{W} + \sigma_+ P_{i,t}^{VB} \Delta t & P_{i,t}^{VB} \geq 0 \\ \dot{C}_{i,t} E_{MC,i}^{W} + \frac{1}{\sigma_-} P_{i,t}^{VB} \Delta t & P_{i,t}^{VB} < 0 \end{cases} . \quad (4)$$

In the above formula, $\dot{C}_{i,t}$ is an energy state variable of the cluster i at the time t, satisfying a range of $0 \leq \dot{C}_{i,t} \leq 1$; $\dot{C}_{i,t}$ depends on a current load borne by the cluster i at the time t; and $E_{MC,i}^{VB}$ is a total capacity of all adjustable flexibility power of the cluster i.

Embodiment 4

Figure 2:
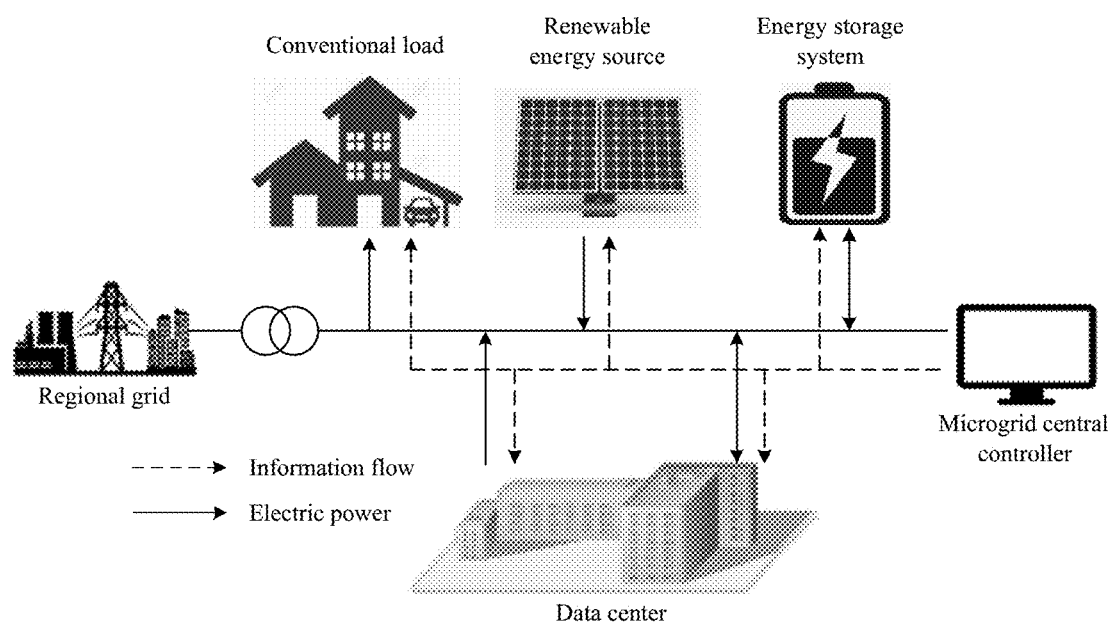
FIG. 2 is a structural diagram of a data center microgrid in a robust dispatch method for flexibility resources of the large-scale data center microgrid cluster according to Embodiment 4 of the present disclosure.

Based on embodiment 3, as shown in FIG. 2, the data center microgrid comprises the central controller of the microgrid, the data center, the renewable energy source, the gas turbine (not shown in the drawing), the conventional load, and the energy storage system. The data center microgrid is connected to the regional power grid via a transformer. The flexibility of the data center microgrid is determined by the flexibility supply capacity and flexibility demand within the microgrid. The flexibility supply is provided by the energy storage system and the gas turbine in the microgrid. The flexibility demand is determined by the scheduling of task loads by the data center.

According to the different network needs of users, data center workloads are divided into delay-sensitive workloads and delay-tolerant workloads. The delay-sensitive workloads can be spatially scheduled and transferred from the data center in one region to the data center in another region with the help of a communication network. The delay-tolerant workloads can be temporally scheduled, and the delay-tolerant workloads arriving at the data center is not required to be processed immediately. Within the preset tolerant delay time, the delay-tolerant workloads can be processed within a certain time range for delay scheduling.

According to the regulation characteristics of the data center loads, the data center loads are divided into four categories. Category 1 is non-transferable load, meaning that such loads basically remain unchanged during normal operation of the data center and cannot participate in the scheduling, and the basic load of servers in the data center is a non-transferable load. Category 2 is a leveling load, which means that the total power consumption remains unchanged in one scheduling cycle, and the loads that can be flexibly dispatched in the time of power consumption deals with energy consumption generated by delay-tolerant workloads. Category 3 is a transferable load, which refers to the load with spatial transfer flexibility in the power supply method, and the energy consumption generated by processing delay-sensitive workloads has this characteristic. Category 4 is a curtailable load, which reduces the power consumption by a certain amount according to the need, and this load is the cooling equipment of the data center.

The step (S120) includes the following steps.

(S410) The formulas for calculating the total load power of the data center are expressed as:

$$P_{i,t}^{load} = P_{i,t}^1 + P_{i,t}^2 + P_{i,t}^3 + P_{i,t}^4 \quad (5); \text{ and}$$

$$P_{i,t}^{loada} = P_{i,t}^2 \quad (6).$$

In the above formulas, $P_{i,t}^{load}$ is the load power of the data center i at the time t; $P_{i,t}^1$ is the basic energy consumption of the data center server; $P_{i,t}^2$ is the energy consumption of processing the delay-tolerant workload; $P_{i,t}^3$ is the energy consumption of processing the delay-sensitive workload; and $P_{i,t}^4$ is the energy consumption of the cooling system; since the schedulable load of the data center microgrid is the delay-sensitive workload, the schedulable load $P_{i,t}^{loada}$ of the data center i satisfies $P_{i,t}^{loada} = P_{i,t}^2$, and formulas for calculating $P_{i,t}^{loada}$ are expressed as:

$$\begin{cases} P_{i,t}^1 = P_{idle}^\xi m_{i,t}^\xi + P_{idle}^\vartheta m_{i,t}^\vartheta \\ P_{i,t}^2 = \dfrac{P_{peak}^\vartheta - P_{idle}^\vartheta}{\mu_i^\vartheta} \vartheta_{i,t} \\ P_{i,t}^3 = \dfrac{P_{peak}^\xi - P_{idle}^\xi}{\mu_i^\xi} \xi_{i,t} \\ P_{i,t}^4 = \kappa_1 Q_{i,t}^c + \kappa_2 \end{cases} \quad (7)$$

wherein $P_{idle}^\xi$ is the no-load power of the single server configured to process the delay-sensitive workload; $P_{peak}^\xi$ is the full-load power of the single server configured to process the delay-sensitive workload; $P_{idle}^\vartheta$ is the no-load power of a single server configured to process the delay-tolerant workload; $P_{peak}^\vartheta$ is the full-load power of the single server configured to process the delay-tolerant workload; $m_{i,t}^\xi$ is the number of active servers configured to process the delay-sensitive workload; $m_{i,t}^\vartheta$ is the number of active servers configured to process the delay-tolerant workload; $\xi_{i,t}$ is the amount of the delay-sensitive workload to be processed at the time t; $\vartheta_{i,t}$ is the amount of the delay-tolerant workload to be processed at the time t; $\mu_i^\xi$ represents average utilization rate of the single server for processing the delay-sensitive workload; $\mu_i^\vartheta$ represents average utilization rate of the single server for processing the delay-tolerant workload; $Q_{i,t}^c$ represents cooling capacity of the data center; and $\kappa_1$ and $\kappa_2$ performance coefficients of the cooling system.

Embodiment 5

Based on the embodiment 4, to reduce the complexity in flexibility resource aggregation, the output of the adjustable flexibility resources is integrated through the virtual battery model, and the adjustable flexibility resources of the data center microgrid include renewable energy, the gas turbine, and the energy storage system. In this embodiment, taking the energy storage system in the data center microgrid as an example, after step (S410), the following steps are performed.

(S510) The upper and lower limits of the energy of the unit energy storage system backward from the time t are derived as follows:

$$E_{ESS,t}^{max\ 1} = \max((E_{ESS}^o + P_{ESS}^{max} t \Delta t), E_{ESS}^{max}) \quad (8);$$

$$E_{ESS,t}^{max\ 2} = \min((E_{ESS}^o + P_{ESS}^{max}(T_{end} - t)\Delta t), E_{ESS}^{max}) \quad (9);$$

$$E_{ESS,t}^{max} = \min(E_{ESS,t}^{max\ 1}, E_{ESS,t}^{max\ 2}) \quad (10);$$

$$E_{ESS,t}^{min\ 1} = \max((E_{ESS}^o + P_{ESS}^{min} t \Delta t), E_{ESS}^{min}) \quad (11);$$

$$E_{ESS,t}^{min\ 2} = \min((E_{ESS}^o + P_{ESS}^{min}(T_{end} - t)\Delta t), E_{ESS}^{min}) \quad (12)$$

$$E_{ESS,t}^{min} = \max(E_{ESS,t}^{min\ 1}, E_{ESS,t}^{min\ 2}) \quad (13);$$

$$P_{ESS,t}^{max} = \min((E_{ESS,t+1}^{max} - E_{ESS,t}^{min})/\Delta t, P_{ESS}^{max}) \quad (14); \text{ and}$$

$$P_{ESS,t}^{min} = \max((E_{ESS,t+1}^{min} - E_{ESS,t}^{max})/\Delta t, P_{ESS}^{min}) \quad (15)$$

In the above formulas, $E_{ESS}^o$ is the initial capacity of the energy storage system (ESS); $E_{ESS,t}^{max\ 1}$ is the upper limit of energy backward from the starting time; $E_{ESS,t}^{max\ 2}$ is the upper limit of energy forward from the end time; $E_{ESS,t}^{min\ 1}$ is the lower limit of energy backward from the starting time; $E_{ESS,t}^{min\ 2}$ is the lower limit of energy forward from the end time; $E_{ESS}^{max}$ is the preset upper limit of energy; $E_{ESS}^{min}$ is the preset lower limit of energy; $E_{ESS,t}^{max}$ is the upper limit of energy of the ESS at the time t; $E_{ESS,t}^{min}$ is the lower limit of energy of the ESS at the time t; $P_{ESS}^{max}$ is the maximum power of the ESS; $P_{ESS}^{min}$ the minimum power of the ESS; $T_{end}$ is the value of a last moment in the solution process; $P_{ESS,t}^{max}$ is the upper limit of an actual power of the ESS at the time t; and $P_{ESS,t}^{min}$ is the lower limit of the actual power of the ESS at the time t.

(S520) The modeling process for other flexible resource integration models in data center microgrids is similar to that of the energy storage system, so Minkowski summation is used to integrate a quantitative feasible set of battery storage for the renewable energy source and the gas turbine and a feasible set of the energy storage system and the schedulable load to obtain a flexibility feasible set $Z_{ac}$, expressed as:

$$Z_{ac} = Z_{ess} \oplus Z_{gt} \oplus Z_{loada} \oplus Z_{pv} \quad (16).$$

In the above formula, $Z_{ess}$ is a flexibility feasible set for the energy storage systems of all the data center microgrid clusters; $Z_{gt}$ is a flexibility feasible set of the gas turbine; $Z_{loada}$ is a flexibility feasible set of the schedulable load; $Z_{pv}$ is a flexibility feasible set of photovoltaic (PV) resource; and $\oplus$ represents the Minkowski summation.

Embodiment 6

Based on the embodiment 5, after the step (S520), the following steps are performed.

The PV output does not have the time coupling property, but since the PV output can be considered not to be cut off during the day-ahead stage, i.e., integrated into the grid as much as possible as a prerequisite. Furthermore, under the condition of discretization of the time intervals, the PV is equivalent to a constant power charging to the virtual battery model and delivering the excess power outwardly during each time interval $\Delta t$, i.e., the amount of energy provided is constant during one time interval $\Delta t$.

(S610) Based on the Minkowski summation, the upper limit and the lower limit of energy, and the upper and the lower limit of power of an integration model of the data center microgrid cluster are expressed as:

$$\overline{E}_{i,t}^W = \sum_{j=1}^{Ne} (E_{ESS,t}^{max}) + \sum_{j=1}^{Ng} (E_{gt,t}^{max}) + \sum_{j=1}^{Nl} (E_{load,t}^{max}) - \left(\sum_{i=1}^{Np} P_{i,t-1}^{PV} \cdot \Delta t\right); \quad (17)$$

-continued $$\overline{E}_{i,t}^{W} = \sum_{j=1}^{Ne}\left(E_{ESS,t}^{min}\right) + \sum_{j=1}^{Ng}\left(E_{gt,t}^{min}\right) + \sum_{j=1}^{Nl}\left(E_{load,t}^{min}\right) - \left(\sum_{i=1}^{Np}P_{i,t-1}^{PV}\cdot\Delta t\right); \quad (18)$$

$$\overline{P}_{i,t}^{DAS} = \sum_{j=1}^{Ne}\left(P_{ESS,t}^{max}\right) + \sum_{j=1}^{Ng}\left(P_{gt,t}^{max}\right) + \sum_{j=1}^{Nl}\left(P_{load,t}^{max}\right) - \sum_{i=1}^{Np}P_{i,t}^{PV}; \text{ and} \quad (19)$$

$$\underline{P}_{i,t}^{DAS} = \sum_{j=1}^{Ne}\left(P_{ESS,t}^{min}\right) + \sum_{j=1}^{Ng}\left(P_{gt,t}^{min}\right) + \sum_{j=1}^{Nl}\left(P_{load,t}^{min}\right) - \sum_{i=1}^{Np}P_{i,t}^{PV}. \quad (20)$$

In the above formulas, $\overline{E}_{i,t}^{W}$ is the upper limit of flexibility resource energy of the data center microgrid cluster i at the time t; $\underline{E}_{j,t}^{W}$ is the lower limit of the flexibility resource energy of the data center microgrid cluster i at the time t; $\overline{P}_{i,t}^{DAS}$ is the upper limit of flexibility resource power of the data center microgrid cluster i at the time t; $\underline{P}_{i,t}^{DAS}$ is the lower limit of the flexibility resource power of the data center microgrid cluster i at the time t; a subscript j represents a corresponding flexibility resource j in the data center microgrid cluster i; $P_{i,t}^{PV}$ is the i-th PV power at the time t; Ne is the number of energy storage; Ng is the number of the gas turbine; Nl is the number of the scheduling load; and Np is the number of the renewable energy source.

Embodiment 7

Based on the embodiment 6, the objective function of the optimal resource-load scheduling plan for each data center at the time T of the following day is expressed as:

$$\min \sum_{t=1}^{T}\sum_{i=1}^{N} \left(F_{i,t}^{gd-da} + F_{i,t}^{gt-da} + F_{i,t}^{ess-da} + F_{i,t}^{loada-da} - \overline{E}_{i,t}^{WS}\delta_{t}^{cap+} - \underline{E}_{i,t}^{WS}\delta_{t}^{cap-}\right). \quad (21)$$

In the above formula, T represents the scheduling moment on the following day; N is the number of the data center microgrid clusters; $F_{i,t}^{gd-da}$ represents cost of electricity purchase of the power grid at the first stage; $F_{i,t}^{gt-da}$ represents operating cost of the gas turbine at the first stage; $F_{i,t}^{ess-da}$ represents operating cost of the energy storage system at the first stage; $F_{i,t}^{loada-da}$ represents scheduling cost of the delay-sensitive workload at the first stage; $\delta_{t}^{cap+}$ and $\delta_{t}^{cap-}$ represent respectively clearing prices obtained from bidding for reserve capacity in an ancillary service market ($\delta_{t}^{cap+}$ represents the clearing price of the upper reserve capacity $\overline{E}_{i,t}^{WS}$, and $\delta_{t}^{cap-}$ represents clearing price of the lower reserve capacity $\underline{E}_{i,t}^{WS}$); $\overline{E}_{i,t}^{WS}$ is an upper limit of the flexibility resource energy of the data center microgrid cluster i at the time t; and $\underline{E}_{i,t}^{WS}$ is the lower limit of the flexibility resource energy of the data center microgrid cluster i at the time t.

Formulas for calculating and $F_{i,t}^{gd-da}$, $F_{i,t}^{gt-da}$, $F_{i,t}^{ess-da}$, and $F_{i,t}^{loada-da}$ are expressed as:

$$\begin{cases} F_{i,t}^{gd-da} = P_{i,t}^{gd}\delta_{i,t}^{gd-da}\Delta t \\ F_{i,t}^{gt-da} = \left(P_{i,t}^{gt}\delta_{i,t}^{gt1}/H_{i}^{gt}\eta_{i}^{gt} + P_{i,t}^{gt}\delta_{i,t}^{gt2}\right)\Delta t \\ F_{i,t}^{ess-da} = \left(P_{i,t}^{essa} + P_{i,t}^{essb}\right)\delta_{i}^{ess}\Delta t \\ F_{i,t}^{loada-da} = N_{i,t}^{tr}\delta_{i}^{tr} \end{cases} \quad (22)$$

In the above formulas, $\delta_{i,t}^{gd-da}$ represents the forecasted electricity price of the day-ahead market in which the data center microgrid cluster i is located at the time t; $\delta_{i,t}^{gt1}$ represents gas purchase cost per unit electricity generated by the gas turbine in the data center microgrid cluster i; $\delta_{i,t}^{gt2}$ represents operating cost per unit electricity generated by the gas turbine in the data center microgrid cluster i; $H_{i}^{gt}$ represents the calorific value of the gas turbine in the data center microgrid cluster i; $\eta_{i}^{gt}$ represents generating efficiency of the gas turbine in the data center microgrid cluster i; $\delta_{i}^{ess}$ represents unit operation cost of the energy storage system in the data center microgrid cluster i; $N_{i,t}^{tr}$ represents the number of spatial scheduling of the delay-sensitive workload in the data center microgrid cluster i; $\delta_{i}^{tr}$ represents unit scheduling cost of the delay-sensitive workload; $\Delta t$ represents scheduling periodic time; $P_{i,t}^{gd}$ represents supplying power of the power grid; represents charging power of the energy storage system in the data center microgrid cluster i; $P_{i,t}^{essb}$ represents discharging power of the energy storage system in the data center microgrid cluster i; and $P_{i,t}^{gt}$ represents supplying power of the gas turbine in the data center microgrid cluster i.

Embodiment 8

Based on the embodiment 7, the step (S130) further includes the following steps.

(S810) The data center operator's participation in the day-ahead electricity market needs to consider both the energy market and the ancillary services market, so resource flexibility must be analyzed as a unified whole, so the formula for representing aggregation scenario of resource flexibility of the data center microgrid is cluster expressed as:

$$P_{i,t}^{pro} = -\overline{P}_{i,t}^{VB\wedge} + \underline{P}_{i,t}^{VB\vee} + P_{i,t}^{gd} + P_{i,t}^{gt} + P_{i,t}^{essa} - P_{i,t}^{essb} \quad (23); \text{ and}$$

$$P_{i,t}^{da} = P_{i,t}^{gd} + P_{i,t}^{gt} + P_{i,t}^{essa} - P_{i,t}^{essb} \quad (24).$$

In the above formulas, $P_{i,t}^{pro}$ is the total power of the data center microgrid cluster i under management of an interactive platform at the time t; $\overline{P}_{i,t}^{VB\wedge}$ is the upper reserve capacity of the data center microgrid cluster i under the management of the interactive platform at the time t; $\underline{P}_{i,t}^{VB\vee}$ is the lower reserve capacity of the data center microgrid cluster i under the management of the interactive platform at the time t; and $P_{i,t}^{da}$ is the predicted power of the data center microgrid cluster i under the management of the interactive platform at the first stage at the time t.

(S820) The reserve capacity determination is directly related to the flexibility resources on the demand side, and the feasible set of flexibility resources defined and integrated in the data center microgrid is obtained:

$$x \in Z_{ac} = Z_{ess} \oplus Z_{gt} \oplus Z_{loada} \oplus Z_{pv} \quad (25).$$

The upper and lower ranges of regulation capacity are as follows:

$$0 \le P_{i,t}^{x} \le \overline{P}_{i,t}^{VBmax}; \quad (26)$$

$$0 \le P_{i,t}^{x} \le \underline{P}_{i,t}^{VBmin}; \quad (27)$$

$$P_{i,t}^{\vee} \le \sum_{x \in Z_{ac}}\left(P_{i,t}^{x} - P_{i,t}^{x,min}\right); \text{ and} \quad (28)$$

$$P_{i,t}^{\wedge} \le \sum_{x \in Z_{ac}}\left(P_{i,t}^{x,max} - P_{i,t}^{x}\right). \quad (29)$$

In the above formulas, $P_{i,t}^{\wedge}$ it is the upper reserve power of the preset power regulation; $P_{i,t}^{\vee}$ is the lower reserve power of the preset power regulation; $P_{i,t}^{x}$ is the scheduling power of resource integration; $P_{i,t}^{x,max}$ is the power upper limit of the resource integration; $P_{i,t}^{x,min}$ is the power lower limit of the resource integration; $\overline{P}_{i,t}^{VBmax}$ is the upper limit of power regulation; $\underline{P}_{i,t}^{VBmin}$ is the lower limit of the power regulation; and the formulas (28) and (29) represent power limitations determined by the resource flexibility.

Embodiment 9

Based on the embodiment 8, under the interactive energy mechanism, the reserve capacity of the flexibility resources of the data center microgrid cluster can participate in the system power balance through auxiliary services, and the objective function of the intraday scheduling model under the flexibility aggregate power in step (S140) is expressed as:

$$\min \sum_{t=t_0}^{t_0+T_{DN}} \sum_{i=1}^{N} \left( F_{i,t}^{dn} + F_{i,t}^{gt-dn} + F_{i,t}^{ess-dn} + F_{i,t}^{loada-dn} \right) - F_{i,t}\left(P_{i,t}^{x+1,min}, P_{i,t}^{da}, P_{i,t}^{x+1,max}\right). \quad (30)$$

In the above formula, $t_0$ is the start time of the optimization window in the second stage; $T_{DN}$ represents rolling optimization window time in the second stage; $F_{i,t}^{dn}$ represents balancing market penalty of the data center microgrid cluster i in the second stage; $F_{i,t}^{gt-dn}$ represents operating cost of the gas turbine in the second stage; $F_{i,t}^{ess-dn}$ represents operating cost of the energy storage system in the second stage; $F_{i,t}^{loada-dn}$ represents scheduling cost of the delay-sensitive workload in the second stage; $F_{i,t}$ represents a revenue function obtained from provision of reserve capacity auxiliary service, expressed as formula (32) under discrete time; $P_{i,t}^{x+1,min}$ represents upside reserve capacity of the data center microgrid cluster i under flexibility aggregate power solution in the second stage; $P_{i,t}^{x+1,max}$ represents downside reserve capacity of the data center microgrid cluster i under the flexibility aggregate power solution in the second stage, which satisfies constraints of an flexible power interval $[P_{i,t}^{x,min}, P_{i,t}^{x,max}]$ for finding the solution of virtual battery model based on the Minkowski summation in day-ahead scheduling; and $P_{i,t}^{da}$ is a predicted power in the first stage.

$F_{i,t}^{gt-dn}$ is calculated by the following formulas:

$$\begin{cases} F_{i,t}^{dn} = \begin{cases} \alpha_i \delta_{i,t}^{balan} \Delta P_{i,t}^{dan} \Delta t, \Delta P_{i,t}^{dan} > 0 \\ \beta_i \delta_{i,t}^{balan} \Delta P_{i,t}^{dan} \Delta t, \Delta P_{i,t}^{dan} < 0 \end{cases} \\ F_{i,t}^{gt-dn} = \left( P_{i,t}^{gt} \delta_{i,t}^{gr1} / H_i^{gt} \eta_i^{gt} + P_{i,t}^{gt} \delta_{i,t}^{gr2} \right) \Delta t \\ F_{i,t}^{ess-dn} = \left( P_{i,t}^{essa} + P_{i,t}^{essb} \right) \delta_i^{ess} \Delta t; \text{ and} \\ F_{i,t}^{loada-dn} = N_{i,t}^{tr} \delta_i^{str} \end{cases} \quad (31)$$

$$F_{i,t} = \delta_{i,t}^{up}\left(P_{i,t}^{x+1,max} - P_{i,t}^{da}\right)^2 + \delta_{i,t}^{down}\left(P_{i,t}^{da} - P_{i,t}^{x+1,min}\right)^2. \quad (32)$$

In the above formulas, $\delta_{i,t}^{balan}$ represents the electricity price in the intraday balancing market; $\Delta P_{i,t}^{dan}$ represents the deviation between intraday purchased power and a day-ahead plan; $\alpha_i$ is the parameter for controlling penalty price in the intraday balancing market when penalty is enforced on power consumption exceeding the day-ahead plan at the higher price than the real-time price; $\beta_i$ is the parameter for controlling the penalty price in the intraday balancing market when penalty is enforced on power consumption below the day-ahead plan at the lower price than the real-time price; $\delta_{i,t}^{up}$ is the upper reserve revenue coefficient; and $\delta_{i,t}^{down}$ is the lower reserve revenue coefficient.

Figure 3:
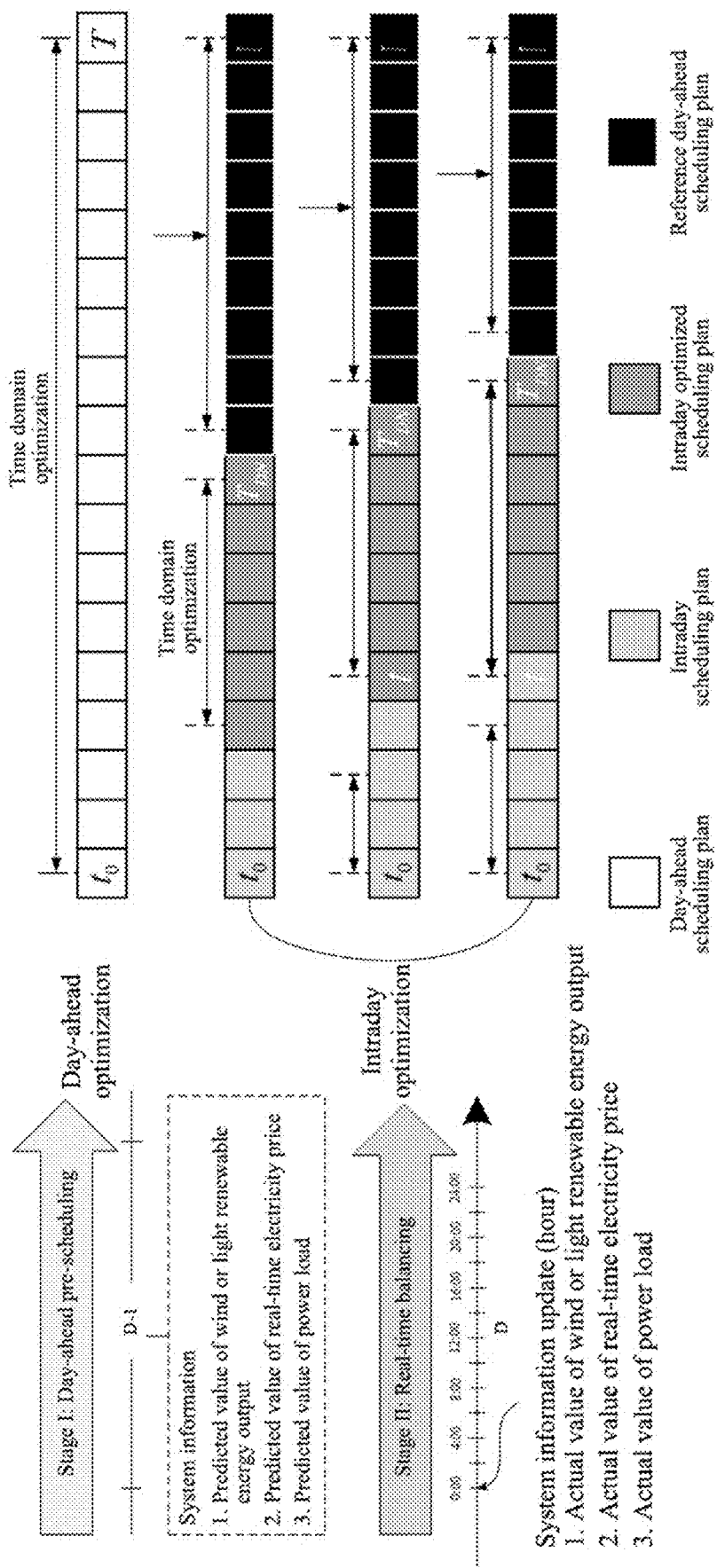
FIG. 3 is a schematic diagram of an intraday rolling optimization process of a data center microgrid cluster in a robust dispatch method for flexibility resources of the large-scale data center microgrid cluster according to Embodiment 10 of the present disclosure.

FIG. 3 is schematic diagram of the intraday rolling optimization process of the data center microgrid cluster. The time window of the intraday optimization is different from the time window of the day-ahead optimization. The optimization time in the day-ahead stage is $[t_0, T]$, and the optimal scheduling plan is sought for the whole T moments. The number of renewable energy sources and workloads in each time stage is the day-ahead prediction value.

In the intraday stage, the optimization time window is $[t, t+T_{DN}]$. The number of the renewable energy sources and workloads at the time t are used as real-time prediction values. The optimal solution of the scheduling plan is sought for the rolling time window, and only the scheduling plan at the time t is used as the optimal result.

Embodiment 10

Based on the embodiment 9, specifically, based on steps (S130) and (S140), the day-ahead-intraday two-stage robust dispatch model of the data center microgrid cluster considering the flexibility aggregation is constructed, and a plurality of data center microgrids are aggregated into a data center microgrid cluster for collaborative control and management. The two-stage robust optimization dispatch model with min-max-min structure is built to obtain the optimal scheduling scheme under the worst scenario.

In the first stage, information interaction among each data center microgrid is coordinated to minimize the total operating cost of the data center operator. In the second stage, based on the day-ahead stage, considering the uncertainty of the PV output and the prediction error for the number of workloads, the workloads of each data center and the microgrids are coordinated in the day-ahead rolling optimization manner to adjust the scheduling plan in real time, thereby tracking the day-ahead plan as much as possible in order to minimize the penalty of the day-ahead market and to provide the reserve capacity.

The step (S150) includes the following steps.

(S1010) The objective function of the day-ahead-intraday two-stage robust dispatch model is expressed as:

$$\min F_{main} + \max_{U} \min F_{sub}. \quad (33)$$

In the formula (33), $F_{main}$ represents the first-stage optimization objective; $\min F_{sub}$ represents the second-stage optimization objective; and U is the uncertainty set involving PV uncertainty and schedulable load uncertainty.

(S1020) The two-stage robust reserve model in this disclosure considers the PV uncertainty, and the uncertainty set U is expressed in formulas (34) to (37):

$$D_{v,t}^{dn} = D_{v,t}^{0} + x_{v,t}^{+}\left(D_{v,t}^{max} - D_{v,t}^{0}\right) - x_{v,t}^{-}\left(D_{v,t}^{0} - D_{v,t}^{min}\right) \forall v, t; \quad (34)$$

$$x_{v,t}^{+} + x_{v,t}^{-} \leq 1 \ \forall v, t; \quad (35)$$

$$\sum_{t=1}^{N_T}\left(x_{v,t}^{+} + x_{v,t}^{-}\right) \leq \Pi_t \ \forall v; \text{ and} \quad (36)$$

-continued $$\sum_{v=1}^{N_v} (x_{v,t}^+ + x_{v,t}^-) \le \Pi_v \ \forall \ t. \quad (37)$$

In the formulas (34) to (37), $N_v$ is the number of PV units; a superscript dn represents an intraday optimization stage; $D_{v,t}^{max}$ represents a maximum value of available PV of a PV unit v at the time t; $D_{v,t}^{min}$ represents a minimum value of the available PV of the PV unit v at the time t; $x_{v,t}^+$ and $x_{v,t}^-$ are integer variables of 0-1, which denote whether or not the PV unit v is fluctuating at the time t; $\Pi_t$ and $\Pi_v$ are both uncertainty limits; the formula (34) represents an available PV $D_{v,t}^{dn}$ at the intraday optimization stage, which consists of a predicted value $D_{v,t}^0$ of the available PV superimposed on an upward fluctuation of PV; the formula (35) represents the available PV $D_{v,t}^{dn}$ in the intraday optimization stage, which consists of the predicted value $D_{v,t}^0$ of the available PV superimposed on a downward fluctuation of PV; the formula (36) represents a temporal uncertainty of PV; and the formula (37) represents a spatial uncertainty of PV.

The uncertainty limit $\Pi_t$ represents the temporal uncertainty of PV output, i.e., the number of moments when PV output fluctuates in the studied time phase. $\Pi_v$ represents the spatial uncertainty of PV output, i.e., the number of PV units with simultaneous power fluctuations in the studied grid.

The larger the uncertainty limits $\Pi_t$ and $\Pi_v$ are set, the larger the uncertainty considered by the model, the more conservative the obtained scheduling strategy is, and the economy of grid operation will be affected. Therefore, the uncertainty limits $\Pi_t$ and $\Pi_v$ can be adjusted to achieve a balance between model economy and reliability. Meanwhile, to avoid the conservatism of the robust optimization model, the dispatcher may set an upper limit on the uncertainty limit.

(S1030) The optimization objective of the day-ahead plan in the first stage is shown in the step (S130). The optimization objective of the second stage considers the uncertainty set based on the optimization objective in the step (S140), and introduces the amount of abandoned light to ensure the feasibility of the subproblem, as shown in the following formula:

$$\max_{x_{v,t}^+, x_{v,t}^- \in U} \min \sum_{t=t_0}^{t_0+T_{DN}} \sum_{i=1}^{N} (F_{i,t}^{dn} + F_{i,t}^{gt-dn} + F_{i,t}^{ess-dn} + F_{i,t}^{loada-dn}) - \quad (38)$$

$$F_{i,t}(P_{i,t}^{x+1,min}, P_{i,t}^{da}, P_{i,t}^{x+1,max}) + F^{cur} \sum_{v=1}^{N_v} (D_{v,t}^{dn} - P_{v,t}^{dn}).$$

In the formula (38), $P_{v,t}^{dn}$ is PV consumption of the PV unit in the second stage; and $F^{cur}$ is penalty cost of the abandoned light.

Figure 4:
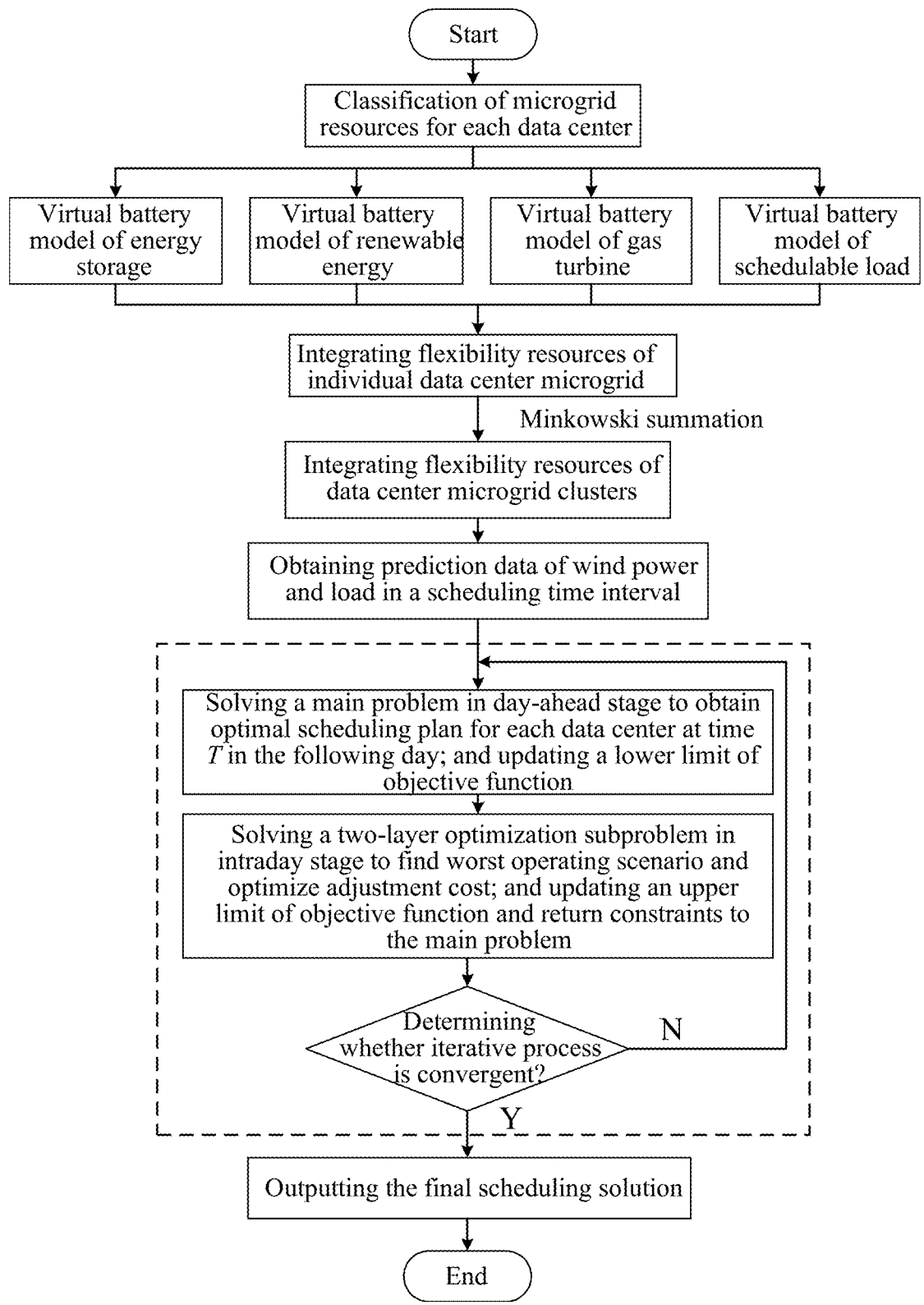
FIG. 4 is a flowchart of a robust dispatch method for flexibility resources of the large-scale data center microgrid cluster according to Embodiment 11 of the present disclosure.

The model in the present disclosure is in the form of min-max-min three-layer optimization. The C&CG algorithm is used to disassemble the min-max-min problem into the main problem of day-ahead scheduling and the subproblem of intra-day scheduling for carrying out the solution of the main problem and the sub-problem alternately and iteratively, thereby obtaining the optimal scheduling scheme. The overall process diagram of the present disclosure is shown in FIG. 4.

Specifically, firstly, the resources of each data center microgrid are classified to obtain the virtual battery model for energy storage, the virtual battery model for renewable energy, the virtual battery model for gas turbines, and the virtual battery model for schedulable loads. Then, the flexibility resources of individual data center microgrid are integrated, and the flexibility resources of the data center microgrid clusters are integrated based on Minkowski summation, in order to obtain the photovoltaic and load prediction data in the scheduling time interval. Then, the main problem in the day-ahead stage is solved to obtain the optimal scheduling plan for each data center at the time Tin the following day and update the lower limit of the objective function. Then, the two-layer optimization subproblem in the intraday stage is solved to find the worst operating scenario and optimize the adjustment cost, update the upper limit of the objective function and return the constraints to the main problem. It is determined whether the iterative process is convergent: if yes, output the final scheduling solution and end; and if no, continue to perform the steps of solving the main problem of the day-ahead stage and thereafter.

The above serial numbers of the above embodiments are only for the purpose of description and do not represent the advantages and disadvantages of the embodiments.

Through the described embodiments, it can be understood that the above embodiments can be realized with the help of software and the necessary general hardware platform, or of course by means of hardware. But, in many cases the former (a combination of software and hardware) is the better implementation way. Based on this understanding, the technical solution of the present disclosure may be embodied in the form of a software product, which is stored in a storage medium (e.g., ROM/RAM, disk, CD-ROM) and includes a number of instructions to enable a terminal (which may be a phone, a computer, a server, an air-conditioner, or a network device) to carry out the method in the various embodiments.

Accordingly, the embodiments above are merely illustrative, and are not intended to limit the scope of the disclosure. It should be understood that any modifications and replacements made by those skilled in the art without departing from the spirit of the disclosure should fall within the scope of the disclosure defined by the appended claims.

What is claimed is:

1. A robust dispatch method for flexibility resource of a data center microgrid cluster, comprising:
    establishing a virtual battery model representing flexibility regulation capacity of each of a plurality of data center microgrids based on adjustable flexibility resources in each of the plurality of data center microgrids;
    obtaining a flexibility region of each of the plurality of data center microgrids based on flexibility supply capacity and flexibility demand capacity of the data center microgrid, and aggregating flexibility regions of the plurality of data center microgrids based on Minkowski summation of constrained spaces, to obtain a power flexibility adjustable interval;
    based on day-ahead forecast information of renewable energy source, workload, and market electricity price, obtaining an optimal resource-load scheduling plan for each of the plurality of data center microgrids at time T of a following day with an objective of minimizing a total operating cost of a data center operator and with power balance, gas turbine, energy storage, and schedulable load as constraints;
    based on an error in forecasting of an output of the renewable energy source and the workload, considering an intraday scheduling model under a flexibility aggregated power with an objective of minimizing an intraday balancing market penalty and system rescheduling cost, and coordinating the gas turbine, the schedulable load, and the energy storage by rolling optimization to adjust the optimal resource-load scheduling plan in real time;

based on the optimal resource-load scheduling plan and the intraday scheduling model, establishing a day-ahead-intraday two-stage robust dispatch model for flexibility resources of the data center microgrid cluster; and in an intraday stage, readjusting, by a microgrid cluster controller, a generating capacity of the gas turbine, a charge capacity and a discharge capacity of an energy storage system, and a generating capacity of the renewable energy source based on a real-time generating capacity of the renewable energy source and a real-time calculated electrical load of a data center; and transferring, by the microgrid cluster controller, a delay-sensitive workload and a delay-tolerant workload of the data center between scheduling periods and between the plurality of data center microgrids; calculating, by the microgrid cluster controller, a day-ahead scheduling plan for the data center microgrid cluster, and setting, by the microgrid cluster controller, operating powers of the gas turbine, the energy storage system, and data center workloads to planned values, thereby realizing the microgrid cluster dispatch.

2. The robust dispatch method of claim 1, wherein the step of based on the optimal resource-load scheduling plan and the intraday scheduling model, establishing a day-ahead-intraday two-stage robust dispatch model for flexibility resources of the data center microgrid cluster comprises:

in a first stage, coordinating information interaction among each data center microgrid, to minimize the total operating cost of the data center operator; and in a second stage, based on the first stage, considering uncertainty of photovoltaic output and a prediction error for the workload; and coordinating the gas turbine, the schedulable load, and the energy storage by rolling optimization to adjust the optimal resource-load scheduling plan in real time, wherein the second stage is the intraday stage.

3. The robust dispatch method of claim 2, wherein the data center microgrid is configured by an aggregation of the renewable energy source, the energy storage, the gas turbine, and controllable load in a microgrid;

the step of "establishing a virtual battery model representing flexibility regulation capacity of a data center microgrid based on adjustable flexibility resource in the data center microgrid" comprises:

assuming that time is discrete, an adjustable flexibility power of a multi-cluster system satisfies:

$$E_{i,t+1}^{W} = \begin{cases} E_{MC,i,t}^{load} + \sigma_+ P_{i,t}^{VB} \Delta t & P_{i,t}^{VB} \geq 0 \\ E_{MC,i,t}^{load} + \frac{1}{\sigma_-} P_{i,t}^{VB} \Delta t & P_{i,t}^{VB} < 0 \end{cases} ; \quad (1)$$

$$\underline{P}_{i,t}^{VB} \leq P_{i,t}^{VB} \leq \overline{P}_{i,t}^{VB}; \text{ and} \quad (2)$$

$$\underline{E}_{i,t+1}^{W} \leq E_{i,t+1}^{W} \leq \overline{E}_{i,t+1}^{W}; \quad (3)$$

wherein $E_{i,t+1}^{W}$ is flexibility resource reserve energy of a cluster i at time t+1; $E_{MC,i,t}^{load}$ is a load bearing state of the cluster i at time t; $\sigma_+$ is charging efficiency; $\sigma_-$ is discharging efficiency; $P_{i,t}^{VB}$ is an adjustable flexibility power of the virtual battery model of the cluster i at the time t in time $\Delta t$; $\overline{P}_{i,t}^{VB}$ is an upper limit of $P_{i,t}^{VB}$; $\underline{P}_{i,t}^{VB}$ is a lower limit of $P_{i,t}^{VB}$; $\underline{E}_{i,t+1}^{W}$ is a downward adjustment constraint of a flexibility energy of the cluster i at the time t+1; $\overline{E}_{i,t+1}^{W}$ is an upward adjustment constraint of the flexibility energy of the cluster i at the time t+1;

Defining $E_{MC,i,t}^{load} = \dot{C}_{i,t} E_{MC,i}^{W}$, $E_{i,t+1}^{W}$ satisfies:

$$E_{i,t+1}^{W} = \begin{cases} \dot{C}_{i,t} E_{MC,i}^{W} + \sigma_+ P_{i,t}^{VB} \Delta t & P_{i,t}^{VB} \geq 0 \\ \dot{C}_{i,t} E_{MC,i}^{W} + \frac{1}{\sigma_-} P_{i,t}^{VB} \Delta t & P_{i,t}^{VB} < 0 \end{cases} ; \quad (4)$$

wherein $\dot{C}_{i,t}$ is an energy state variable of the cluster i at the time t, satisfying a range of $0 \leq \dot{C}_{i,t} \leq 1$; $\dot{C}_{i,t}$ depends on a current load borne by the cluster i at the time t; and $E_{MC,i}^{VB}$ is a total capacity of all adjustable flexibility power of the cluster i.

4. The robust dispatch method of claim 3, wherein the data center microgrid comprises the data center, the renewable energy source, the gas turbine, and the energy storage system;

the data center microgrid is connected to an upper-level power grid through a transformer; flexibility of the data center microgrid is determined by the flexibility supply capacity and the flexibility demand capacity in the data center microgrid; flexibility supply is provided by the energy storage system and the gas turbine in the data center microgrid; flexibility demand is determined by scheduling of task loads by the data center; and according to different network demands of users, the data center workloads are divided into the delay-sensitive workload and the delay-tolerant workload;

the step of "obtaining a flexibility region of each of the plurality of data center microgrids based on flexibility supply capacity and flexibility demand capacity of the data center microgrid; and aggregating the flexibility regions of the plurality of data center microgrids based on Minkowski summation of constrained spaces, to obtain a power flexibility adjustable interval" comprises:

obtaining a formula of calculating total load power of the data center, expressed as:

$$P_{i,t}^{load} = P_{i,t}^{1} + P_{i,t}^{2} + P_{i,t}^{3} + P_{i,t}^{4} \quad (5); \text{ and}$$

$$P_{i,t}^{loada} = P_{i,t}^{2} \quad (6);$$

wherein $P_{i,t}^{load}$ is a load power of a data center i at the time t; $P_{i,t}^{1}$ is basic energy consumption of a data center server; $P_{i,t}^{2}$ is energy consumption of processing the delay-tolerant workload; $P_{i,t}^{3}$ is energy consumption of processing the delay-sensitive workload; and $P_{i,t}^{4}$ is energy consumption of the cooling system; since schedulable load of the data center microgrid is the delay-sensitive workload, schedulable load $P_{i,t}^{loada}$ of the data center i satisfies $P_{i,t}^{loada} = P_{i,t}^{2}$, and formulas for calculating $P_{i,t}^{loada}$ are expressed as:

$$\begin{cases} P_{i,t}^{1} = P_{idle}^{\xi} m_{i,t}^{\xi} + P_{idle}^{\vartheta} m_{i,t}^{\vartheta} \\ P_{i,t}^{2} = \frac{P_{peak}^{\vartheta} - P_{idle}^{\vartheta}}{\mu_{i}^{\vartheta}} \vartheta_{i,t} \\ P_{i,t}^{3} = \frac{P_{peak}^{\xi} - P_{idle}^{\xi}}{\mu_{i}^{\xi}} \xi_{i,t} \\ P_{i,t}^{4} = \kappa_1 Q_{i,t}^{c} + \kappa_2 \end{cases} ; \quad (7)$$

wherein $P_{idle}^\xi$ is a no-load power of a single server configured to process the delay-sensitive workload; $P_{peak}^\xi$ is a full-load power of the single server configured to process the delay-sensitive workload; $P_{idle}^\vartheta$ is a no-load power of a single server configured to process the delay-tolerant workload; $P_{peak}^\vartheta$ is a full-load power of the single server configured to process the delay-tolerant workload; $m_{i,t}^\xi$ is the number of active servers configured to process the delay-sensitive workload; $m_{i,t}^\vartheta$ is the number of active servers configured to process the delay-tolerant workload; $\xi_{i,t}$ is the amount of the delay-sensitive workload to be processed at the time t; $\vartheta_{i,t}$ is the amount of the delay-tolerant workload to be processed at the time t; $\mu_i^\xi$ represents average utilization rate of the single server for processing the delay-sensitive workload; $\mu_i^\vartheta$ represents average utilization rate of the single server for processing the delay-tolerant workload; $Q_{i,t}^c$ represents cooling capacity of the data center; and $\kappa_1$ and $\kappa_2$ performance coefficients of the cooling system.

5. The robust dispatch method of claim 4, wherein after obtaining the formula of calculating total load power of the data center, upper and lower limits of energy of a unit storage energy system backward from the time t are derived as follows:

$$E_{ESS,t}^{max\,1} = \max((E_{ESS}^o + P_{ESS}^{max} t\Delta t), E_{ESS}^{max}) \quad (8);$$

$$E_{ESS,t}^{max\,2} = \min((E_{ESS}^o + P_{ESS}^{max}(T_{end}-t)\Delta t), E_{ESS}^{max}) \quad (9);$$

$$E_{ESS,t}^{max} = \min(E_{ESS,t}^{max\,1}, E_{ESS,t}^{max\,2}) \quad (10);$$

$$E_{ESS,t}^{min\,1} = \max((E_{ESS}^o + P_{ESS}^{min} t\Delta t), E_{ESS}^{min}) \quad (11);$$

$$E_{ESS,t}^{min\,2} = \min((E_{ESS}^o + P_{ESS}^{min}(T_{end}-t)\Delta t), E_{ESS}^{min}) \quad (12);$$

$$E_{ESS,t}^{min} = \max(E_{ESS,t}^{min\,1}, E_{ESS,t}^{min\,2}) \quad (13);$$

$$P_{ESS,t}^{max} = \min((E_{ESS,t+1}^{max} - E_{ESS,t}^{min})/\Delta t, P_{ESS}^{max}) \quad (14); \text{ and}$$

$$P_{ESS,t}^{min} = \max((E_{ESS,t+1}^{min} - E_{ESS,t}^{max})/\Delta t, P_{ESS}^{min}) \quad (15);$$

wherein $E_{ESS}^o$ is an initial capacity of the energy storage system (ESS); $E_{EES,t}^{max\,1}$ is an upper limit of energy backward from a starting time; $E_{EES,t}^{max\,2}$ is an upper limit of energy forward from an end time; $E_{EES,t}^{min\,1}$ is a lower limit of energy backward from the starting time; $E_{EES,t}^{min\,2}$ is a lower limit of energy forward from the end time; $E_{EES,t}^{max}$ is a preset upper limit of energy; $E_{EES,t}^{min}$ is a preset lower limit of energy; $E_{EES,t}^{max}$ is an upper limit of energy of the ESS at the time t; $E_{EES,t}^{min}$ is a lower limit of energy of the ESS at the time t; $P_{EES}^{max}$ is a maximum power of the ESS; $P_{EES}^{min}$ is a minimum power of the ESS; $T_{end}$ is a value of a last moment in a solution process; $P_{EES,t}^{max}$ is a upper limit of an actual power of the ESS at the time t; and $P_{EES,t}^{min}$ is a lower limit of the actual power of the ESS at the time t;

Minkowski sum is used to integrate a quantitative feasible set of battery storage for the renewable energy source and the gas turbine and a feasible set of the energy storage system and the schedulable load to obtain a flexibility feasible set $Z_{ac}$, expressed as:

$$Z_{ac} = Z_{ess} \oplus Z_{gt} \oplus Z_{loada} \oplus Z_{pv} \quad (16);$$

wherein $Z_{ess}$ is a flexibility feasible set for the energy storage systems of all the data center microgrid clusters; $Z_{gt}$ is a flexibility feasible set of the gas turbine; $Z_{loada}$ is a flexibility feasible set of the schedulable load; $Z_{pv}$ is a flexibility feasible set of photovoltaic (PV) resource; and $\oplus$ represents the Minkowski summation.

6. The robust dispatch method of claim 5, wherein after the Minkowski summation is used to integrate the quantitative feasible set of battery storage for the renewable energy source and the gas turbine and the feasible set of the energy storage system and the schedulable load to obtain the flexibility feasible set $Z_{ac}$, based on the Minkowski summation, an upper limit and a lower limit of energy, and an upper and a lower limit of power of an integration model of the data center microgrid cluster are expressed as:

$$\bar{E}_{i,t}^W = \sum_{j=1}^{Ne}(E_{ESS,t}^{max}) + \sum_{j=1}^{Ng}(E_{gt,t}^{max}) + \sum_{j=1}^{Nl}(E_{load,t}^{max}) - \left(\sum_{i=1}^{Np} P_{i,t-1}^{PV} \cdot \Delta t\right); \quad (17)$$

$$\underline{E}_{i,t}^W = \sum_{j=1}^{Ne}(E_{ESS,t}^{min}) + \sum_{j=1}^{Ng}(E_{gt,t}^{min}) + \sum_{j=1}^{Nl}(E_{load,t}^{min}) - \left(\sum_{i=1}^{Np} P_{i,t-1}^{PV} \cdot \Delta t\right); \quad (18)$$

$$\bar{P}_{i,t}^{DAS} = \sum_{j=1}^{Ne}(P_{ESS,t}^{max}) + \sum_{j=1}^{Ng}(P_{gt,t}^{max}) + \sum_{j=1}^{Nl}(P_{load,t}^{max}) - \sum_{i=1}^{Np} P_{i,t}^{PV}; \text{ and} \quad (19)$$

$$\underline{P}_{i,t}^{DAS} = \sum_{j=1}^{Ne}(P_{ESS,t}^{min}) + \sum_{j=1}^{Ng}(P_{gt,t}^{min}) + \sum_{j=1}^{Nl}(P_{load,t}^{min}) - \sum_{i=1}^{Np} P_{i,t}^{PV}; \quad (20)$$

wherein $\bar{E}_{i,t}^W$ is an upper limit of flexibility resource energy of the data center microgrid cluster i at the time t; $\underline{E}_{i,t}^W$ is a lower limit of the flexibility resource energy of the data center microgrid cluster i at the time t; $\bar{P}_{i,t}^{DAS}$ is an upper limit of flexibility resource power of the data center microgrid cluster i at the time t; $\underline{P}_{i,t}^{DAS}$ is a lower limit of the flexibility resource power of the data center microgrid cluster i at the time t; a subscript j represents a corresponding flexibility resource j in the data center microgrid cluster i; $P_{i,t}^{PV}$ is a i-th PV power at the time t; Ne is the number of energy storage; Ng is the number of the gas turbine; N/is the number of the scheduling load; and Np is the number of the renewable energy source.

7. The robust dispatch method of claim 6, wherein an objective function of the optimal resource-load scheduling plan for each data center at the time T of the following day is expressed as:

$$\min \sum_{t=1}^{T} \sum_{i=1}^{N} \quad (21)$$

$$\left(F_{i,t}^{gd-da} + F_{i,t}^{gt-da} + F_{i,t}^{ess-da} + F_{i,t}^{loada-da} - \bar{E}_{i,t}^{WS}\delta_t^{cap+} - \underline{E}_{i,t}^{WS}\delta_t^{cap-}\right);$$

wherein T represents a scheduling moment on the following day; N is the number of the data center microgrid clusters; $F_{i,t}^{gd-da}$ represents cost of electricity purchase of a power grid at the first stage; $F_{i,t}^{gt-da}$ represents operating cost of the gas turbine at the first stage; $F_{i,t}^{ess-da}$ represents operating cost of the energy storage system at the first stage; $F_{i,t}^{loada-da}$ represents scheduling cost of the delay-sensitive workload at the first stage; $\delta_t^{cap+}$ and $\delta_t^{cap-}$ represent respectively clearing prices obtained from bidding for reserve capacity in an ancillary service market; $\bar{E}_{i,t}^{WS}$ is an upper limit of the flexibility resource energy of the data center microgrid cluster i at the time t; $\underline{E}_{i,t}^{WS}$ is a lower limit of the flexibility resource energy of the data center microgrid cluster i at the time t;

formulas for calculating $F_{i,t}^{gd-da}$, $F_{i,t}^{gt-da}$, $F_{i,t}^{ess-da}$, and $F_{i,t}^{loada-da}$ are expressed as:

$$\begin{cases} F_{i,t}^{gd-da} = P_{i,t}^{gd} \delta_{i,t}^{gd-da} \Delta t \\ F_{i,t}^{gt-da} = (P_{i,t}^{gt} \delta_{i,t}^{gt1}/H_i^{gt} \eta_i^{gt} + P_{i,t}^{gt} \delta_{i,t}^{gt2}) \Delta t \\ F_{i,t}^{ess-da} = (P_{i,t}^{essa} + P_{i,t}^{essb}) \delta_i^{ess} \Delta t \\ F_{i,t}^{loada-da} = N_{i,t}^{tr} \delta_i^{tr} \end{cases} \quad (22)$$

wherein $\delta_{i,t}^{gd-da}$ represents a forecasted electricity price of a day-ahead market in which the data center microgrid cluster i is located at the time t; $\delta_{i,t}^{gt1}$ represents gas purchase cost per unit electricity generated by the gas turbine in the data center microgrid cluster i; $\delta_{i,t}^{gt2}$ represents operating cost per unit electricity generated by the gas turbine in the data center microgrid cluster i; $H_i^{gt}$ represents a calorific value of the gas turbine in the data center microgrid cluster i; $\eta_i^{gt}$ represents generating efficiency of the gas turbine in the data center microgrid cluster i; $\delta_i^{ess}$ represents unit operation cost of the energy storage system in the data center microgrid cluster i; $N_{i,t}^{tr}$ represents the number of spatial scheduling of the delay-sensitive workload in the data center microgrid cluster i; $\delta_{i,t}^{tr}$ represents unit scheduling cost of the delay-sensitive workload; $\Delta t$ represents scheduling periodic time; $P_{i,t}^{gd}$ represents supplying power of the power grid; $P_{i,t}^{essa}$ sa represents charging power of the energy storage system in the data center microgrid cluster i; $P_{i,t}^{essb}$ represents discharging power of the energy storage system in the data center microgrid cluster i; and $P_{i,t}^{gt}$ represents supplying power of the gas turbine in the data center microgrid cluster i.

8. The robust dispatch method of claim 7, wherein the step of "based on an error in forecasting of an output of the renewable energy source and the workload, considering an intraday scheduling model under a flexibility aggregated power with an objective of minimizing an intraday balancing market penalty and system rescheduling cost, and coordinating the gas turbine, the schedulable load, and the energy storage by rolling optimization to adjust the optimal resource-load scheduling plan in real time" further comprises:

obtaining a formula for representing aggregation scenario of resource flexibility of the data center microgrid cluster, expressed as:

$$P_{i,t}^{pro} = -\overline{P}_{i,t}^{VB\wedge} + \underline{P}_{i,t}^{VB\vee} + P_{i,t}^{gd} + P_{i,t}^{gt} + P_{i,t}^{essa} - P_{i,t}^{essb} \quad (23); \text{ and}$$

$$P_{i,t}^{da} = P_{i,t}^{gd} + P_{i,t}^{gt} + P_{i,t}^{essa} - P_{i,t}^{essb} \quad (24);$$

wherein $P_{i,t}^{pro}$ is a total power of the data center microgrid cluster i under management of an interactive platform at the time t; $\underline{P}_{i,t}^{VB\wedge}$ is an upper reserve capacity of the data center microgrid cluster i under the management of the interactive platform at the time t; $\underline{P}_{i,t}^{VB\vee}$ is a lower reserve capacity of the data center microgrid cluster i under the management of the interactive platform at the time t; and $P_{i,t}^{da}$ is a predicted power of the data center microgrid cluster i under the management of the interactive platform at the first stage at the time t;

obtaining a feasible set of flexibility resources defined and integrated in the data center microgrid:

$$x \in Z_{ac} = Z_{ess} \oplus Z_{gt} \oplus Z_{loada} \oplus Z_{pv} \quad (25);$$

obtaining upper and lower ranges of regulation capacity:

$$0 \leq P_{i,t}^x \leq \overline{P}_{i,t}^{VBmax} \quad (26)$$

$$0 \leq P_{i,t}^x \leq \underline{P}_{i,t}^{VBmin} \quad (27)$$

$$P_{i,t}^{\vee} \leq \sum_{x \in Z_{ac}} (P_{i,t}^x - P_{i,t}^{x,min}); \text{ and} \quad (28)$$

$$P_{i,t}^{\wedge} \leq \sum_{x \in Z_{ac}} (P_{i,t}^{x,max} - P_{i,t}^x); \quad (29)$$

wherein $P_{i,t}^{\wedge}$ is an upper reserve power of a preset power regulation; $P_{i,t}^{\vee}$ is a lower reserve power of the preset power regulation; $P_{i,t}^{x}$ is a scheduling power of resource integration; $P_{i,t}^{x,max}$ is a power upper limit of the resource integration; $P_{i,t}^{x,min}$ is a power lower limit of the resource integration; $\overline{P}_{i,t}^{VBmax}$ is an upper limit of power regulation; $\underline{P}_{i,t}^{VBmin}$ is a lower limit of the power regulation; and the formulas (28) and (29) represent power limitations determined by the resource flexibility.

9. The robust dispatch method of claim 8, wherein an objective function of the intraday scheduling model under the flexibility aggregate power is expressed as:

$$\min \sum_{t=t_0}^{t_0+T_{DN}} \sum_{i=1}^{N} (F_{i,t}^{dn} + F_{i,t}^{gt-dn} + F_{i,t}^{ess-dn} + F_{i,t}^{loada-dn}) - F_{i,t}(P_{i,t}^{x+1,min}, P_{i,t}^{da}, P_{i,t}^{x+1,max}); \quad (30)$$

wherein $t_0$ is a start time of an optimization window in the second stage; $T_{DN}$ represents rolling optimization window time in the second stage; $F_{i,t}^{dn}$ represents balancing market penalty of the data center microgrid cluster i in the second stage; $F_{i,t}^{gt-dn}$ represents operating cost of the gas turbine in the second stage; $F_{i,t}^{ess-dn}$ represents operating cost of the energy storage system in the second stage; $F_{i,t}^{loada-dn}$ represents scheduling cost of the delay-sensitive workload in the second stage; $F_{i,t}$ represents a revenue function obtained from provision of reserve capacity auxiliary service, expressed as formula (32) under discrete time; $P_{i,t}^{x+1,min}$ represents downside reserve capacity of the data center microgrid cluster i under flexibility aggregate power solution in the second stage; $P_{i,t}^{x+1,max}$ represents upside reserve capacity of the data center microgrid cluster i under the flexibility aggregate power solution in the second stage, which satisfies constraints of an flexible power interval $[P_{i,t}^{x,min}, P_{i,t}^{x,max}]$ for finding a solution of the virtual battery model based on the Minkowski summation in day-ahead scheduling; and $P_{i,t}^{da}$ is a predicted power in the first stage; $F_{i,t}^{gt-dn}$ is calculated by the following formulas:

$$\begin{cases} F_{i,t}^{dn} = \begin{cases} \alpha_i \delta_{i,t}^{balan} \Delta P_{i,t}^{dan} \Delta t, \Delta P_{i,t}^{dan} > 0 \\ \beta_i \delta_{i,t}^{balan} \Delta P_{i,t}^{dan} \Delta t, \Delta P_{i,t}^{dan} < 0 \end{cases} \\ F_{i,t}^{gt-dn} = (P_{i,t}^{gt} \delta_{i,t}^{gt1}/H_i^{gt} \eta_i^{gt} + P_{i,t}^{gt} \delta_{i,t}^{gt2}) \Delta t; \text{ and} \\ F_{i,t}^{ess-dn} = (P_{i,t}^{essa} + P_{i,t}^{essb}) \delta_i^{ess} \Delta t \\ F_{i,t}^{loada-dn} = N_{i,t}^{tr} \delta_i^{tr} \end{cases} \quad (31)$$

$$F_{i,t} = \delta_{i,t}^{up}(P_{i,t}^{x+1,max} t - P_{i,t}^{da})^2 + \delta_{i,t}^{down}(P_{i,t}^{da} - P_{i,t}^{x+1,min})^2; \quad (32)$$

wherein $\delta_{i,t}^{balan}$ represents electricity price in the intraday balancing market; $\Delta P_{i,t}^{dan}$ represents deviation between intraday purchased power and a day-ahead plan; $\alpha_i$ is a parameter for controlling penalty price in the intraday balancing market when penalty is enforced on power consumption exceeding the day-ahead plan at a higher price than a real-time price; $\beta_i$ is a parameter for controlling the penalty price in the intraday balancing market when penalty is enforced on power consumption below the day-ahead plan at a lower price than the real-time price; $\delta_{i,t}^{up}$ is an upper reserve revenue coefficient; and $\delta_{i,t}^{down}$ is a lower reserve revenue coefficient.

10. The robust dispatch method of claim 9, wherein the step of "based on the optimal resource-load scheduling plan and the intraday scheduling model, establishing a day-ahead-intraday two-stage robust dispatch model for flexibility resource of the large-scale data center microgrid cluster" comprises:

obtaining an objective function of the day-ahead-intraday two-stage robust dispatch model:

$$\min F_{main} + \max_{U} \min F_{sub}; \tag{33}$$

wherein $F_{main}$ represents a first-stage optimization objective; $\min F_{sub}$ represents a second-stage optimization objective; and $U$ is an uncertainty set involving PV uncertainty and schedulable load uncertainty;

the uncertainty set $U$ is expressed in formulas (34) to (37):

$$D_{v,t}^{dn} = D_{v,t}^0 + X_{v,t}^+(D_{v,t}^{max} - D_{v,t}^0) - x_{v,t}^-(D_{v,t}^0 - D_{v,t}^{min})\ \forall\ v,\ t; \tag{34}$$

$$X_{v,t}^+ + x_{v,t}^- \le 1\ \forall\ v,\ t; \tag{35}$$

$$\sum_{t=1}^{N_T}(x_{v,t}^+ + x_{v,t}^-) \le \prod\nolimits_t\ \forall\ v; \tag{36}$$

$$\sum_{v=1}^{N_v}(x_{v,t}^+ + x_{v,t}^-) \le \prod\nolimits_v\ \forall\ t; \tag{37}$$

wherein $N_v$ is the number of PV units; a superscript dn represents an intraday optimization stage; $D_{v,t}^{max}$ represents a maximum value of available PV of a PV unit $v$ at the time $t$; $D_{v,t}^{min}$ represents a minimum value of the available PV of the PV unit $v$ at the time $t$; $x_{v,t}^+$ and $x_{v,t}^-$ are integer variables of 0-1, which denote whether or not the PV unit $v$ is fluctuating at the time $t$; $\Pi_t$ and $\Pi_v$ are both uncertainty limits; the formula (34) represents an available PV $D_{v,t}^{dn}$ at the intraday optimization stage, which consists of a predicted value $D_{v,t}^0$ of the available PV superimposed on an upward fluctuation of PV; the formula (35) represents the available PV $D_{v,t}^{dn}$ in the intraday optimization stage, which consists of the predicted value $D_{v,t}^0$ of the available PV superimposed on a downward fluctuation of PV; the formula (36) represents a temporal uncertainty of PV; and the formula (37) represents a spatial uncertainty of PV;

introducing the amount of abandoned light to ensure feasibility of the intraday scheduling, expressed as:

$$\max_{x_{v,t}^+, x_{v,t}^- \in U} \min \sum_{t=t_0}^{t_0+T_{DN}} \sum_{i=1}^{N} (F_{i,t}^{dn} + F_{i,t}^{gt-dn} + F_{i,t}^{ess-dn} + F_{i,t}^{loada-dn}) - \\ F_{i,t}(P_{i,t}^{i+1,min}, P_{i,t}^{da}, P_{i,t}^{i+1,max}) + F^{cur} \sum_{v=1}^{N_v}(D_{v,t}^{dn} - P_{v,t}^{dn}); \tag{38}$$

wherein $P_{v,t}^{dn}$ is PV consumption of the PV unit in the second stage; and $F^{cur}$ is penalty cost of the abandoned light.

\* \* \* \* \*